(12) United States Patent
Yoo et al.

(10) Patent No.: US 12,449,923 B2
(45) Date of Patent: Oct. 21, 2025

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Gi-Na Yoo, Yongin-si (KR); Juyeon Kim, Yongin-si (KR); Donghee Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/939,735

(22) Filed: Nov. 7, 2024

(65) Prior Publication Data

US 2025/0165089 A1    May 22, 2025

(30) Foreign Application Priority Data

Nov. 16, 2023  (KR) .................. 10-2023-0159039

(51) Int. Cl.
*G06F 3/041* (2006.01)
*G06F 3/044* (2006.01)
*H10K 59/40* (2023.01)

(52) U.S. Cl.
CPC .......... *G06F 3/0412* (2013.01); *G06F 3/0445* (2019.05); *G06F 3/0446* (2019.05); *G06F 2203/04111* (2013.01); *G06F 2203/04112* (2013.01); *H10K 59/40* (2023.02)

(58) Field of Classification Search
CPC .... G06F 3/0412; G06F 3/0445; G06F 3/0443; G06F 3/0446; G06F 2203/04111; G06F 2203/04112; H10K 59/40
See application file for complete search history.

(56) References Cited

U.S. PATENT DOCUMENTS

| 10,126,864 B2 | 11/2018 | Jeong et al. |
| 10,901,567 B2 | 1/2021 | Lee et al. |
| 2019/0051711 A1 | 2/2019 | Lee et al. |
| 2022/0069027 A1* | 3/2022 | Wang .................. H10K 50/813 |

(Continued)

FOREIGN PATENT DOCUMENTS

| CN | 116193928 A | 5/2023 |
| CN | 116322202 A | 6/2023 |

(Continued)

*Primary Examiner* — Deeprose Subedi
(74) *Attorney, Agent, or Firm* — F. CHAU & ASSOCIATES, LLC

(57) ABSTRACT

A display device includes a display panel including light-emitting regions and an input sensor disposed on the display panel and including sensing patterns. The sensing patterns include mesh lines defining opening regions respectively overlapping the light-emitting regions and protruding portions having a shape protruding from at least one of the mesh lines into the opening regions. The protruding portions include a first protruding portion disposed between light-emitting regions spaced apart from each other by a first distance in a first direction and a second protruding portion which is disposed between light-emitting regions spaced apart from each other by a second distance smaller than the first distance in the first direction and has a smaller area than the first protruding portion in a plan view, thereby exhibiting excellent display quality and viewing angle characteristics.

27 Claims, 22 Drawing Sheets

(56) References Cited

U.S. PATENT DOCUMENTS

| | | |
|---|---|---|
| 2022/0223656 A1 | 7/2022 | Kim |
| 2023/0157115 A1 | 5/2023 | Choi et al. |
| 2023/0422587 A1 | 12/2023 | Liu |
| 2025/0143090 A1* | 5/2025 | Zeng .................... G06F 3/0446 |

FOREIGN PATENT DOCUMENTS

| | | |
|---|---|---|
| CN | 116339540 A | 6/2023 |
| KR | 10-2017-0131755 A | 11/2017 |
| KR | 10-2329084 B1 | 11/2021 |

* cited by examiner

DISPLAY DEVICE AND ELECTRONIC DEVICE INCLUDING THE SAME

CROSS-REFERENCE TO RELATED APPLICATIONS

This U.S. non-provisional patent application claims priority under 35 U.S.C. § 119 to Korean Patent Application No. 10-2023-0159039, filed on Nov. 16, 2023, the entire contents of which are hereby incorporated by reference.

TECHNICAL FIELD

The present disclosure relates to a display device, and more particularly, to a display device including an input sensor with mesh line protrusions.

DISCUSSION OF THE RELATED ART

Multimedia devices such as televisions, mobile phones, tablet computers, navigation systems, game consoles, and the like include a display device that displays images to a user through a display screen. The display device may include a display panel that generates images and an input sensor that senses a user's touch.

The input sensor may include a conductive layer, and the conductive layer of the input sensor disposed on the display panel may affect the light output efficiency of the display device, the external light reflection of the display device, the external visibility of a specific pattern, and the like depending on the direction of light extraction.

SUMMARY

A display device includes a display panel including a plurality of light-emitting regions and an input sensor disposed on the display panel and including a plurality of sensing patterns. The sensing patterns include a plurality of mesh lines defining a plurality of opening regions respectively overlapping the plurality of light-emitting regions and a plurality of protruding portions having a shape protruding from at least one of the mesh lines into the opening regions. The protruding portions include a first protruding portion disposed between light-emitting regions spaced apart from each other by a first distance in a first direction among the light-emitting regions and a second protruding portion disposed between light-emitting regions spaced apart from each other by a second distance that is smaller than the first distance in the first direction among the light-emitting regions and has a smaller area than the first protruding portion in a plan view.

The protruding portions may be formed integrally with the mesh lines.

In the plan view, each of the protruding portions may have a circular, oval, tetragonal, or polygonal shape, or a combination of the above shapes.

Ss the first distance increases, the area of the first protruding portion in the plan view may increase.

As the first distance increases, the size of the first protruding portion in the first direction may increase.

The size of the first protruding portion in the first direction may be smaller than the first distance, and the size of the first protruding portion in a second direction crossing the first direction may be smaller than the width of each of the light-emitting regions in the second direction.

The sensing patterns may further include cut portions defined in some of the mesh lines.

The light-emitting regions may be spaced apart from each other in the plan view, a separation distance between the light-emitting regions neighboring each other in the first direction may be greater than a separation distance therebetween in a second direction different from the first direction, and the protruding portions might not be disposed between the light-emitting regions spaced apart from each other in the second direction.

The input sensor may be disposed directly on the display panel, and the input sensor may include a plurality of insulating layers including a first sensor insulating layer, a second sensor insulating layer disposed on the first sensor insulating layer, and a third sensor insulating layer disposed on the second sensor insulating layer. A first sensor conductive layer may be disposed between the first sensor insulating layer and the second sensor insulating layer. A second sensor conductive layer may be disposed between the second sensor insulating layer and the third sensor insulating layer. The protruding portions may be disposed on the same layer as the second sensor conductive layer.

The sensing patterns may further include cut portions defined in some of the mesh lines on the same layer as the second sensor conductive layer.

The sensing patterns may be disposed on the same layer as the first sensor conductive layer and may further include a third protruding portion overlapping the cut portion.

A display device includes a display panel including a plurality of light-emitting units including a first color light-emitting region, a second color light-emitting region spaced apart from the first color light-emitting region in a first direction, and a third color light-emitting region spaced apart from each of the first color light-emitting region and the second color light-emitting region in a second direction crossing the first direction. An input sensor is disposed on the display panel and the input sensor includes a plurality of mesh lines that do not overlap the first color light-emitting region, the second color light-emitting region, and the third color light-emitting region. A plurality of protruding portions protrude from the mesh lines toward the color light-emitting regions. The light-emitting units include a first light-emitting unit with its third color light-emitting region overlapping the entire first color light-emitting region in the second direction and only a portion of the second color light-emitting region. A second light-emitting unit with its third color light-emitting region overlapping an entirety of the second color light-emitting region in the second direction and only a portion of the first color light-emitting region, wherein the protruding portions include: a first protruding portion disposed between the third color light-emitting region of the first light-emitting unit and the third color light-emitting region of the second light-emitting unit. A second protruding portion is disposed between the second color light-emitting region of the first light-emitting unit and the first light-emitting region of the second light-emitting unit. The area of the first protruding portion is larger than the area of the second protruding portion.

The first light-emitting unit and the second light-emitting unit may be alternately arranged in each of the first direction and the second direction.

The third color light-emitting region of the first light-emitting unit and the third color light-emitting region of the second light-emitting unit, which are disposed with the first protruding portion interposed therebetween, may be spaced apart from each other by a first distance. The second color light-emitting region of the first light-emitting unit and the first color light-emitting region of the second light-emitting unit, which are disposed with the second protruding portion interposed therebetween, may be spaced apart from each other by a second distance that is smaller than the first distance.

As the first separation distance increases, the size of the first protruding portion in the first direction may increase.

A first portion, in which a separation distance between neighboring third color light-emitting regions in the first direction is a first distance, and a second portion, in which a separation distance between the third color light-emitting regions is a third distance smaller than the first distance, may be alternately positioned. The protruding portions might not be disposed in the second portion.

The size of the first protruding portion in the first direction may be less than or equal to a first distance between two third color light-emitting regions disposed with the first protruding portion interposed therebetween. The size of the first protruding portion in the second direction may be less than or equal to the width of each of the third color light-emitting regions in the second direction.

The mesh lines may define a plurality of opening regions respectively overlapping the first to third color light-emitting regions and including a first mesh line extending in the first direction and a second mesh line extending in the second direction.

The protruding portions may be formed integrally with the second mesh line.

The mesh lines may further include a third mesh line extending in the second direction and disposed between the first light-emitting region and the second light-emitting region.

The input sensor may further include a cut portion defined in the third mesh line. The cut portion might not overlap the protruding portions in the second direction.

The first protruding portion and the second protruding portion may overlap each other in the second direction.

The first color light-emitting region may be a red light-emitting region, the second color light-emitting region may be a green light-emitting region, and the third color light-emitting region may be a blue light-emitting region.

A display device includes a display panel including a plurality of light-emitting regions and an input sensor disposed on the display panel and including a plurality of mesh lines defining a plurality of opening regions respectively overlapping the plurality of light-emitting regions and a plurality of protruding portions having a shape protruding from at least one of the mesh lines into the opening regions. The light-emitting regions include a first light-emitting region spaced apart from the mesh line in one direction by a first separation distance and a second light-emitting region spaced apart from the mesh line in the one direction by a second separation distance smaller than the first separation distance. The protruding portions include a first protruding portion protruding from the mesh line toward the first light-emitting region and a second protruding portion protruding from the mesh line toward the second light-emitting region and having a less size in the one direction than the first protruding portion.

The input sensor may be disposed directly on the display panel and may include a plurality of insulating layers including a first sensor insulating layer, a second sensor insulating layer disposed on the first sensor insulating layer, and a third sensor insulating layer disposed on the second sensor insulating layer. A first sensor conductive layer may be disposed between the first sensor insulating layer and the second sensor insulating layer. A second sensor conductive layer may be disposed between the second sensor insulating layer and the third sensor insulating layer. The protruding portions may be disposed on the same layer as the second sensor conductive layer.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
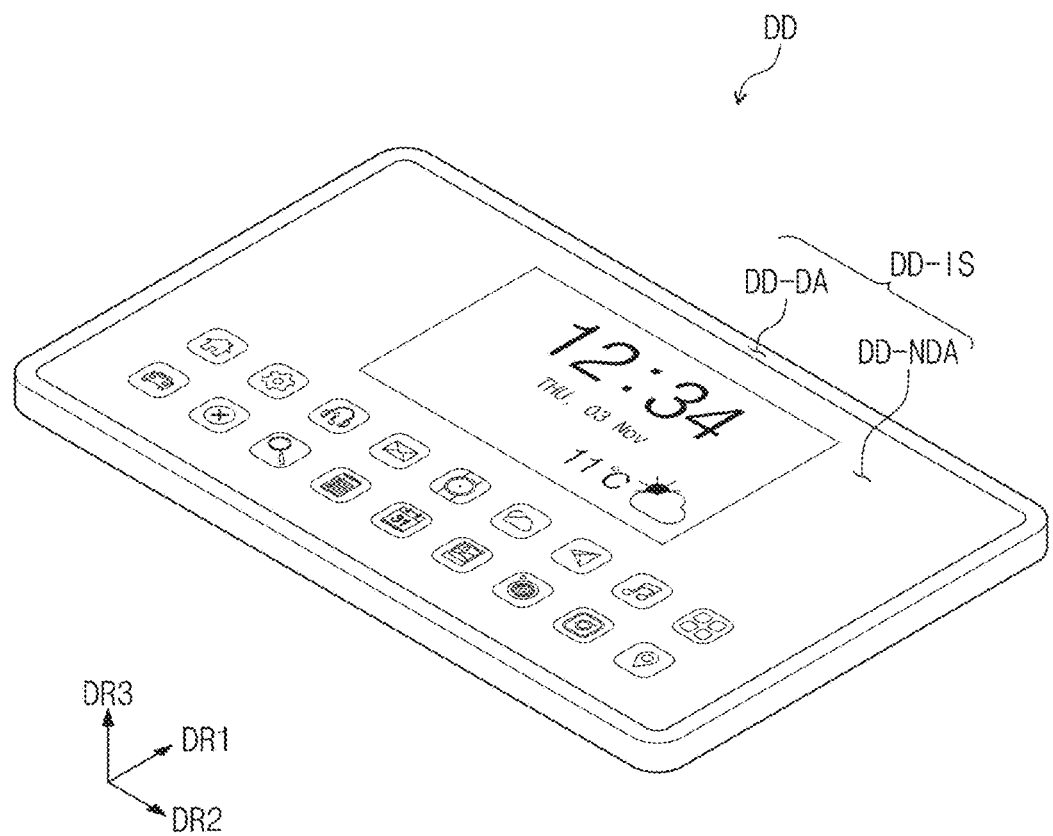
FIG. 1 is a perspective view of a display device according to an embodiment of the inventive concept.

In the present invention, various modifications can be made, various forms can be used, and specific embodiments will be illustrated in the drawings and described in detail in the text. However, this is not necessarily intended to limit the present invention to a specific form disclosed, and it will be understood that all changes, equivalents, or substitutes which fall in the spirit and technical scope of the present invention should be included.

In this specification, it will be understood that when an element (or region, layer, portion, etc.) is referred to as being "on", "connected to" or "coupled to" another element, it can be directly on, connected or coupled to the other element, or intervening elements may be present.

Like reference numerals may refer to like elements throughout the specification and the drawings. While each drawing may represent one or more particular embodiments of the present disclosure, drawn to scale, such that the relative lengths, thicknesses, and angles can be inferred therefrom, it is to be understood that the present invention is not necessarily limited to the relative lengths, thicknesses, and angles shown. Changes to these values may be made within the spirit and scope of the present disclosure, for example, to allow for manufacturing limitations and the like. As used herein, the term "and/or" includes any and all combinations that the associated configurations can define.

It will be understood that, although the terms first, second, etc. may be used herein to describe various elements, these elements should not necessarily be limited by these terms. These terms are used to distinguish one element from another element. For example, a first element could be termed a second element without departing from the scope of the present invention. Similarly, the second element may also be referred to as the first element. The terms of a singular form include plural forms unless otherwise specified.

In addition, terms, such as "below", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or groups thereof, but do not necessarily preclude the presence or addition of one or more other features, integers, steps, operations, elements, components, and/or groups thereof.

In the present application, being "disposed directly" may mean that there is no layer, film, region, plate, or the like added between a part such as a layer, film, region, or plate and another part such as a layer, film, region, or plate. For example, being "disposed directly" may mean that no additional member such as an adhesive member is disposed between two layers or two members.

Hereinafter, a display device, according to an embodiment of the inventive concept, will be described with reference to the accompanying drawings.

FIG. 1 is a perspective view of a display device DD according to an embodiment of the inventive concept. As illustrated in FIG. 1, the display device DD may display an image through a display surface DD-IS. In a plan view, the display surface DD-IS may have a rectangular shape with a pair of short sides extending in a first direction DR1 and a pair of long sides extending in a second direction DR2 crossing the first direction DR1. Without necessarily being limited thereto, however, the display surface DD-IS may have various shapes such as a circle or a polygon.

In this embodiment, a third direction DR3 may be defined as a direction substantially perpendicular to a plane defined by the first direction DR1 and the second direction DR2. The front (or upper) and rear (or lower) surfaces of each member constituting the display device DD may be opposed to each other in the third direction DR3, and the normal direction of each of the front and rear surfaces may be substantially parallel to the third direction DR3. A separation distance between the front and rear surfaces defined along the third direction DR3 may correspond to the thickness of a member.

In this specification, the expression "in a plan view" may be defined as viewed in the third direction DR3. That is, the expression "in a plan view" may be described based on a plane defined by both the first direction DR1 and the second direction DR2. In this specification, the expression "on a cross section" may be defined as viewed in the first direction DR1 or the second direction DR2. Directions indicated by the first to third directions DR1, DR2, and DR3 are relative concepts and may be converted into other directions.

In an embodiment of the inventive concept, the display device DD having a flat display surface is illustrated, but the embodiment of the inventive concept is not necessarily limited thereto. The display device DD may include a curved display surface or a three-dimensional display surface. For example, the three-dimensional display surface may include a plurality of display regions, which indicate directions different from each other, and may also include a bent display surface. The display device DD, according to this embodiment, may be a flexible display device DD. The flexible display device DD may be a foldable display device that can be folded to a noticeable extent without cracking or otherwise sustaining damage.

FIG. 1 and the like exemplarily illustrate the display device DD that may be applied to a tablet terminal. Electronic modules, a camera module, a power module, and the like mounted on a main board may be disposed together with the display device DD on a bracket/case and the like so as to constitute the tablet terminal. The embodiment of the inventive concept is not necessarily limited thereto, and the display device DD may be applied to not only large electronic devices such as televisions and computer monitors, but also small and medium-sized electronic devices such as mobile phones, car navigation systems, portable game consoles, and smart watches.

As illustrated in FIG. 1, the display surface DD-IS includes an active region DD-DA in which an image is displayed and a bezel region DD-NDA adjacent to the active region DD-DA. The bezel region DD-NDA is a region in which no image is displayed. FIG. 1 illustrates icon images as an example of an image.

As illustrated in FIG. 1, the active region DD-DA may have a substantially tetragonal shape. "A substantially tetragonal shape" includes not only a tetragonal shape in a mathematical sense, but also a tetragonal shape in which corners have been rounded.

The bezel region DD-NDA may at least partially surround the active region DD-DA. As used herein, the phrase "at least partially surround" is understood to mean that the surrounding element contacts the surrounded element on at least one side or portion thereof, may contact the surrounded element on two sides, whether those sides are opposite sides or proximate sides, may contact the surrounded element on more than two sides, and may even completely surround the surrounded element. Without necessarily being limited thereto, however, the shape of the bezel region DD-NDA may be modified. For example, the bezel region DD-NDA may be disposed only on one side of the active region DD-DA.

Figure 2:
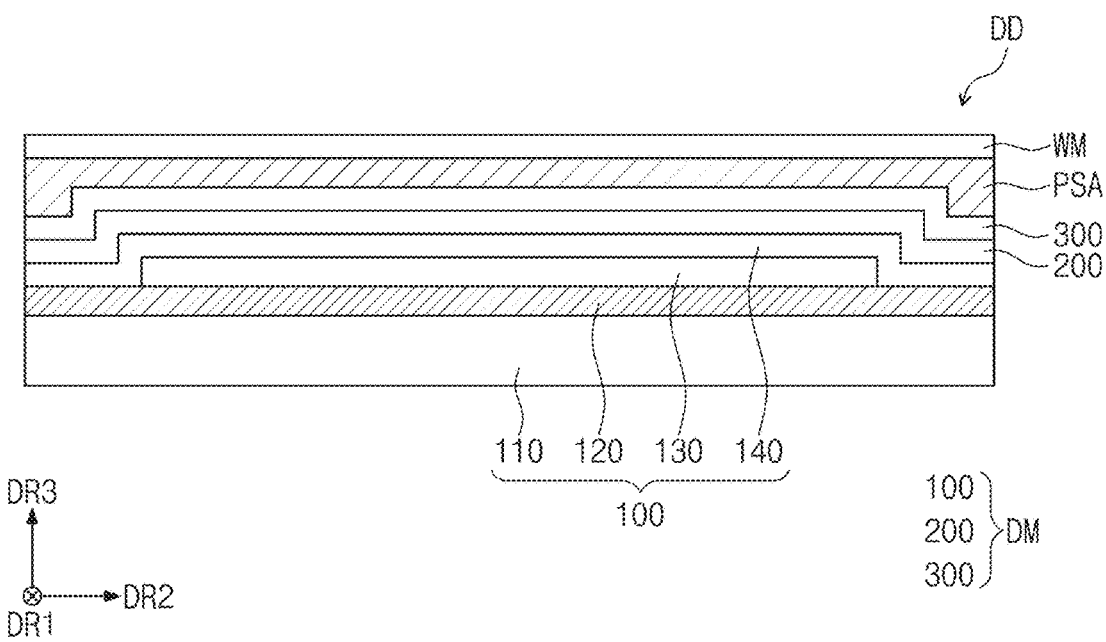
FIG. 2 is a cross-sectional view of the display device according to an embodiment of the inventive concept.

FIG. 2 is a cross-sectional view of the display device DD according to an embodiment of the inventive concept.

The display device DD may include a display module DM and a window WM disposed on the display module DM. The display module DM and the window WM may be coupled to each other by an adhesive layer PSA. However, the embodiment of the inventive concept is not necessarily limited thereto, and in an embodiment of the inventive concept, the adhesive layer PSA may be omitted. In an embodiment of the inventive concept, the window WM may be formed by a coating method, and the window WM may be disposed directly on the display module DM.

The display module DM may include a display panel 100, an input sensor 200, and a light controller 300. The display panel 100 may include a base layer 110, a circuit element layer 120, a display element layer 130, and an encapsulation layer 140.

The base layer 110 may be a flexible substrate capable of being bent, folded, rolled, or the like, to a noticeable extent without cracking or otherwise sustaining damage. The base layer 110 may be a glass substrate, a metal substrate, or a polymer substrate. However, the embodiment of the inventive concept is not necessarily limited thereto, and the base layer 110 may be an inorganic layer, an organic layer, or a composite material layer. The base layer 110 may have substantially the same shape as the display panel 100.

The base layer 110 may have a multi-layered structure. For example, the base layer 110 may include a first synthetic resin layer, a second synthetic resin layer, and inorganic layers disposed between them. Each of the first and second synthetic resin layers may include a polyimide-based resin, but the embodiment of the inventive concept is not necessarily particularly limited thereto.

The circuit element layer 120 may be disposed on the base layer 110. The circuit element layer 120 may include a plurality of insulating layers, a plurality of semiconductor patterns, a plurality of conductive patterns, signal lines, and the like. The circuit element layer 120 may include a pixel driving circuit.

The display element layer 130 may be disposed on the circuit element layer 120. The display element layer 130 may include a light-emitting element. For example, the light-emitting element may include an organic light-emitting material, an inorganic light-emitting material, an organic-inorganic light-emitting material, a quantum dot, a quantum rod, a micro LED, or a nano LED.

The encapsulation layer 140 may be disposed on the display element layer 130. The encapsulation layer 140 may protect the display element layer 130, for example, the light-emitting element, from moisture, oxygen, and foreign substances such as dust particles. The encapsulation layer 140 may include at least one inorganic encapsulation layer. The encapsulation layer 140 may include a stacked structure of a first inorganic encapsulation layer/an organic encapsulation layer/a second inorganic encapsulation layer.

The input sensor 200 may be disposed directly on the display panel 100. The input sensor 200 may sense a user's input, for example, by an electromagnetic induction method and/or a capacitance method. The display panel 100 and the input sensor 200 may be formed through a continuous process. Here, being "disposed directly" may mean that a third component is not disposed between the input sensor 200 and the display panel 100. For example, a separate adhesive layer might not be disposed between the input sensor 200 and the display panel 100.

The light controller 300 may be a reflection reduction layer that reduces the reflectance of external light incident from the outside of the display device DD. However, the embodiment of the inventive concept is not necessarily limited thereto, and the light controller 300 may include various components to constitute a light control layer for improving the display quality of the display device DD. For example, the light controller 300 according to an embodiment of the inventive concept may include a polarizing layer, a phase retarder, a destructive interference structure, a plurality of color filters, or the like. The light controller 300 may be omitted in the display device DD, according to an embodiment of the inventive concept.

The window WM, according to an embodiment of the inventive concept, may include a base substrate and a light-shielding pattern. The base substrate may include a glass substrate and/or a synthetic resin film. The light-shielding pattern may partially overlap the base substrate. The light-shielding pattern may substantially correspond to the bezel region DD-NDA (see FIG. 1) of the display device DD. A region in which the light-shielding pattern is not disposed may correspond to the active region DD-DA (see FIG. 1) of the display device DD. In this specification, an expression "a region/portion corresponds to another region/portion" may mean that "they overlap each other", but the expression is not necessarily limited to having a same area and/or a same shape.

Figure 3:
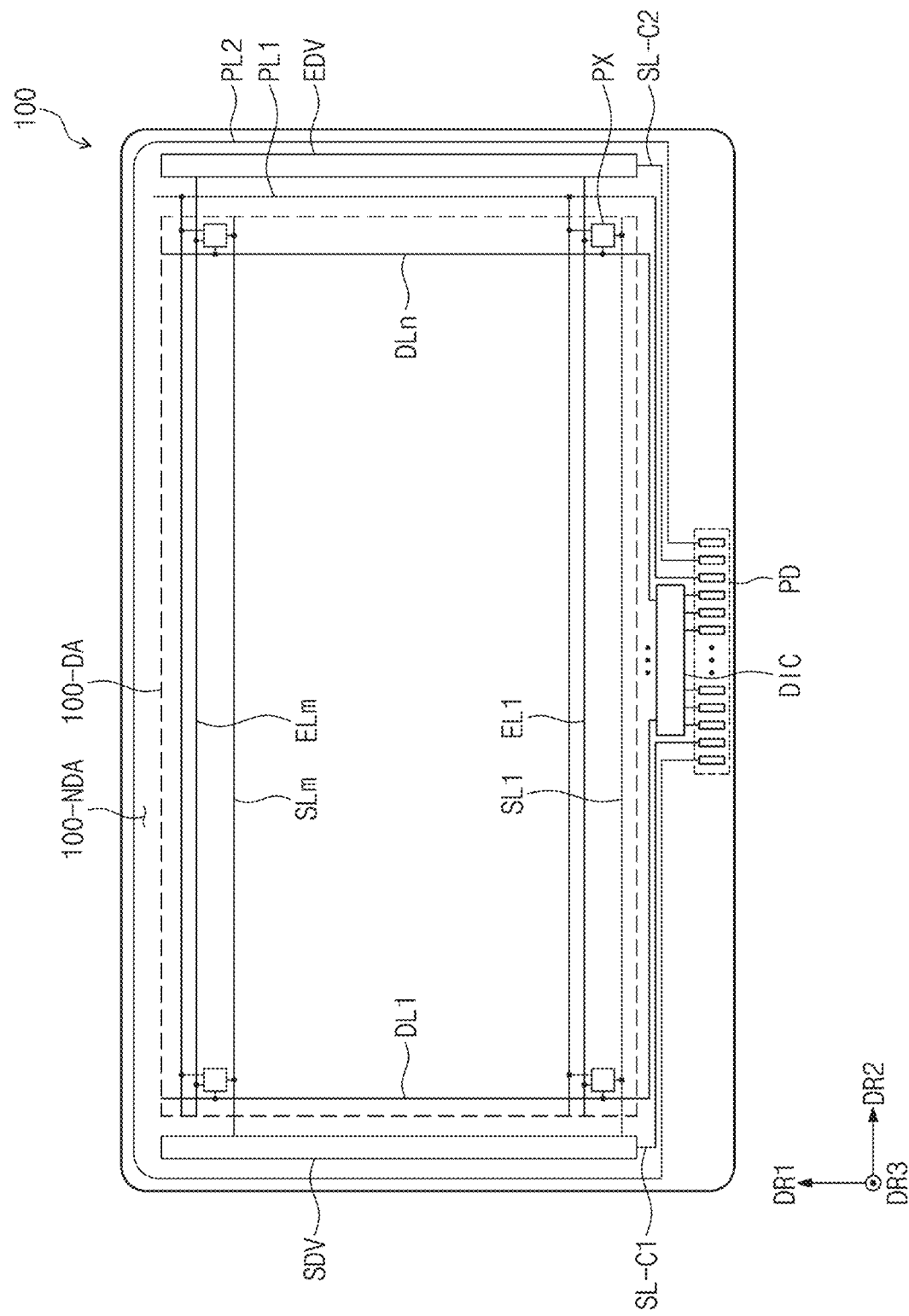
FIG. 3 is a plan view of a display panel according to an embodiment of the inventive concept.

FIG. 3 is a plan view of a display panel 100 according to an embodiment of the inventive concept.

Referring to FIG. 3, the display panel 100 may include a plurality of pixels PX, a scan driving circuit SDV, a light-emitting driving circuit EDV, a plurality of signal lines, and a plurality of pads PD. The plurality of pixels PX are disposed in a display region 100-DA. A driving chip DIC mounted in a non-display region 100-NDA may include a data driving circuit. The display region 100-DA may correspond to the active region DD-DA (see FIG. 1) of the display device DD (see FIG. 1), and the non-display region 100-NDA may correspond to the bezel region DD-NDA (see FIG. 1). In addition, in an embodiment of the inventive concept, the data driving circuit may also be integrated into the display panel 100 like the scan driving circuit SDV and the light-emitting driving circuit EDV.

The plurality of signal lines may include a plurality of scan lines SL1 to SLm, a plurality of data lines DL1 to DLn, a plurality of light-emitting lines EL1 to ELm, first and second control lines SL-C1 and SL-C2, and first and second power lines PL1 and PL2, wherein m and n are integers greater than or equal to 2.

The scan lines SL1 to SLm may extend in the second direction DR2 and be electrically connected to the pixels PX and the scan driving circuit SDV. The data lines DL1 to DLn may extend in the first direction DR1 and be electrically connected to the pixels PX and the driving chip DIC. The light-emitting lines EL1 to ELm may extend in the second direction DR2 and be electrically connected to the pixels PX and the light-emitting driving circuit EDV.

The first power line PL1 receives a first power voltage, and the second power line PL2 receives a second power voltage lower than the first power voltage. A second electrode (e.g., cathode) of the light-emitting element may be connected to the second power line PL2.

The first control line SL-C1 may be connected to the scan driving circuit SDV and extend toward the lower end of the display panel 100. The second control line SL-C2 may be connected to the light-emitting driving circuit EDV and extend toward the lower end of the display panel 100. The pads PD may be disposed in the non-display region 100-NDA adjacent to the lower end of the display panel 100 and be closer to the lower end of the display panel 100 than the driving chip DIC. The pads PD may be connected to the driving chip DIC and some signal lines.

The scan driving circuit SDV may generate a plurality of scan signals, and the scan signals may be applied to the pixels PX through the scan lines SL1 to SLm. The driving chip DIC may generate a plurality of data voltages, and the data voltages may be applied to the pixels PX through the data lines DL1 to DLn. The light-emitting driving circuit EDV may generate a plurality of light-emitting signals, and the light-emitting signals may be applied to the pixels PX through the light-emitting lines EL1 to ELm. The pixels PX may receive data voltages in response to scan signals. The pixels PX may display an image by emitting light having a luminance corresponding to data voltages in response to the light-emitting signals.

Figure 4A:
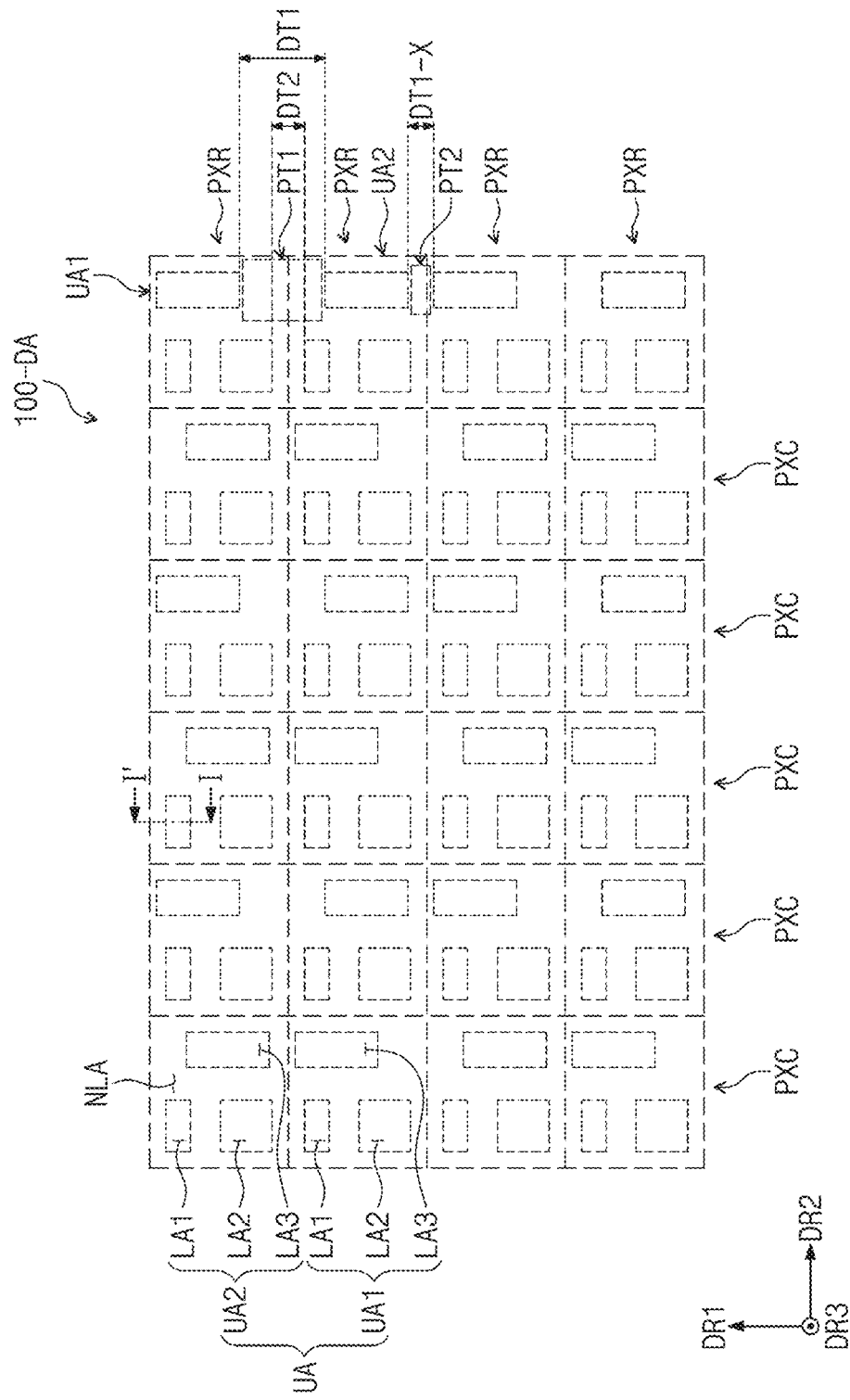
FIGS. 4A and 4B are enlarged plan views of a portion of a display region according to an embodiment of the inventive concept.
Figure 4B:
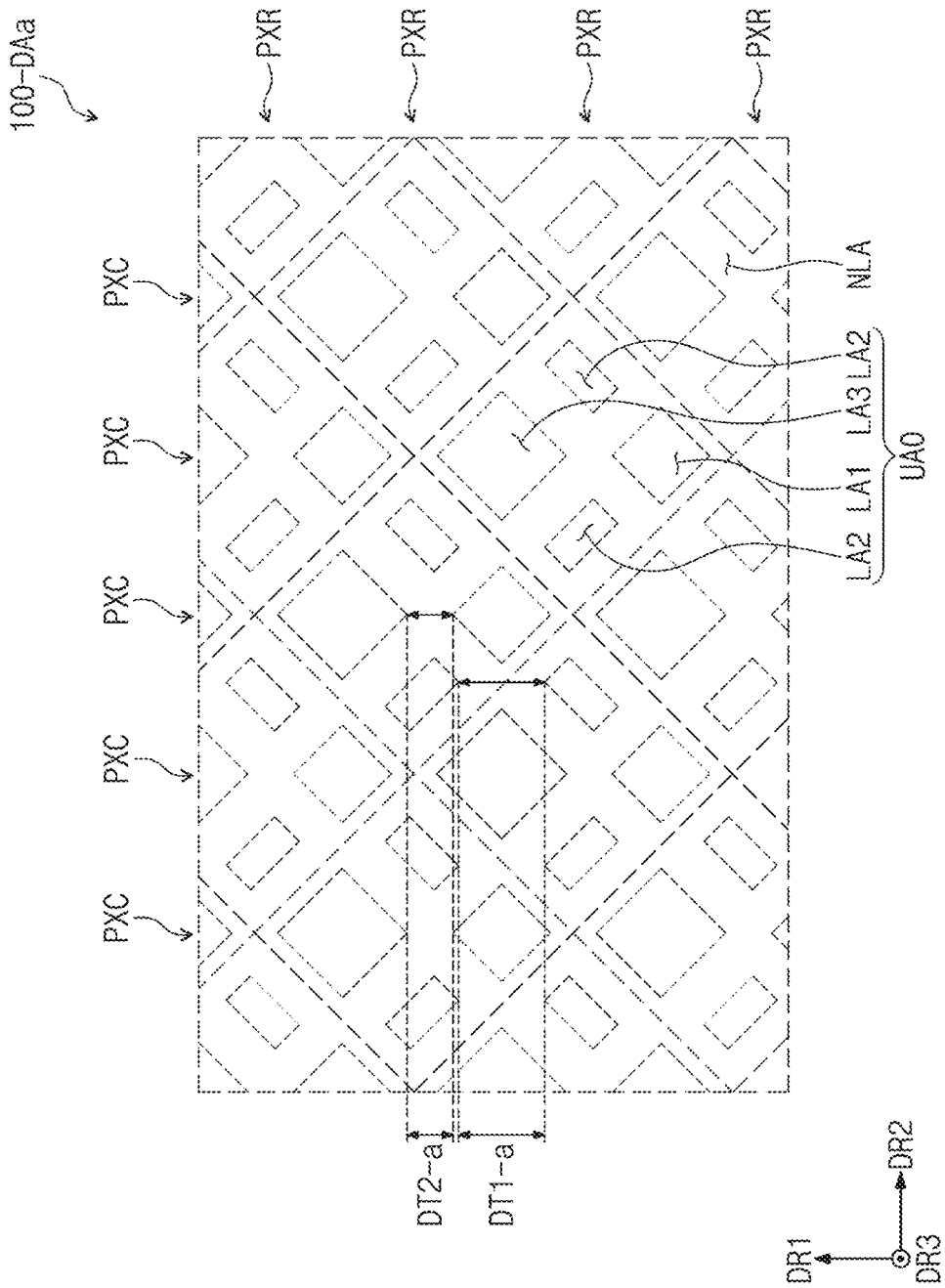

Each of FIGS. 4A and 4B is an enlarged plan view of a portion of the display region of the display device according to an embodiment of the inventive concept.

Referring to FIGS. 4A and 4B, display regions 100-DA and 100-DAa may include a plurality of light-emitting regions LA1, LA2, and LA3 and a non-light-emitting region NLA adjacent to the plurality of light-emitting regions LA1, LA2, and LA3. The non-light-emitting region NLA sets the boundary of the light-emitting regions LA1, LA2, and LA3.

The light-emitting regions LA1, LA2, and LA3 may be disposed in a one-to-one correspondence with the pixels PX of FIG. 3. Each of the pixels PX may include a light-emitting element, and the light-emitting regions LA1, LA2, and LA3 may be regions in which light generated from the light-emitting element is emitted. The light-emitting regions LA1, LA2, and LA3 may be regions defined by a pixel defining film PDL (see FIG. 5). The arrangement relationship between the light-emitting regions LA1, LA2, and LA3 and the non-light-emitting region NLA will be described later with reference to FIG. 5 and the like.

The light-emitting regions LA1, LA2, and LA3 may include a first light-emitting region LA1 (or first color light-emitting region) forming a first color light, a second light-emitting region LA2 (or second color light-emitting region) forming a second color light, and a third light-emitting region LA3 (or third color light-emitting region) forming a third color light. In this embodiment, the first color light may be red light, the second color light may be green light, and the third color light may be blue light.

The areas of the first light-emitting region LA1, the second light-emitting region LA2, and the third light-emitting region LA3 may be different from each other, but the embodiment of the inventive concept is not necessarily limited thereto. In an embodiment of the inventive concept, the first light-emitting region LA1 may have the smallest area and the third light-emitting region LA3 may have the largest area. The areas of the light-emitting regions may be defined as areas on a plane defined by the first and second directions DR1 and DR2.

The first to third light-emitting regions LA1, LA2, and LA3 may have various shapes in a plan view. For example, the first to third light-emitting regions LA1, LA2, and LA3 may have a substantially polygonal shape such as a quadrangle or an octagon, a circular shape, or an oval shape. In FIGS. 4A and 4B, each of the first to third light-emitting regions LA1, LA2, and LA3 is illustrated to have a rectangular shape. However, this is an example, and the first to third light-emitting regions LA1, LA2, and LA3 may have various shapes besides a quadrangle, and at least one of the first to third light-emitting regions LA1, LA2, and LA3 may have a planar shape different from those of the others. The shape of each of the first to third light-emitting regions LA1, LA2, and LA3 may correspond to the shape of a light-emitting opening PDL-OP (see FIG. 5) of the pixel defining film PDL (see FIG. 5).

In an embodiment of the inventive concept illustrated in FIG. 4A, the first light-emitting region LA1, the second light-emitting region LA2, and the third light-emitting region LA3 may define one light-emitting unit UA. The light-emitting unit UA is a repeated arrangement unit of the light-emitting regions disposed in the display region 100-DA. The display device DD (see FIG. 1), according to an embodiment of the inventive concept, may include a first light-emitting unit UA1 and a second light-emitting unit UA2.

Referring to FIG. 4A, in the first light-emitting unit UA1 and the second light-emitting unit UA2, the first light-emitting region LA1 and the second light-emitting region LA2 may overlap each other in the first direction DR1 and be spaced apart from each other in the first direction DR1. In the first light-emitting unit UA1 and the second light-emitting unit UA2, the third light-emitting region LA3 may be spaced apart from each of the first light-emitting region LA1 and the second light-emitting region LA2 in the second direction DR2.

In the first light-emitting unit UA1 and the second light-emitting unit UA2, the positions of the third light-emitting regions LA3 with respect to the first light-emitting region LA1 and the second light-emitting region LA2 in the first direction DR1 may be different from each other.

In the first light-emitting unit UA1, the third light-emitting region LA3 with respect to the first light-emitting region LA1 and the second light-emitting region LA2 in the first direction DR1 may be disposed on the upper side. In the first light-emitting unit UA1, according to an embodiment of the inventive concept, the third light-emitting region LA3 may overlap the entire first light-emitting region LA1 in the second direction DR2 and a portion of the second light-emitting region LA2 in the second direction DR2.

In the second light-emitting unit UA2, the third light-emitting region LA3 with respect to the first light-emitting region LA1 and the second light-emitting region LA2 in the first direction DR1 may be disposed on the lower side. In the second light-emitting unit UA2, according to an embodiment of the inventive concept, the third light-emitting region LA3 may overlap the entire second light-emitting region LA2 in the second direction DR2 and a portion of the first light-emitting region LA1 in the second direction DR2.

In the display device DD (see FIG. 1), according to an embodiment of the inventive concept, the first light-emitting unit UA1 and the second light-emitting unit UA2 may be alternately arranged in each of the first direction DR1 and the second direction DR2.

The first light-emitting unit UA1 and the second light-emitting unit UA2 may be alternately disposed along the first direction DR1 in a pixel column PXC. In addition, the first light-emitting unit UA1 and the second light-emitting unit UA2 may be alternately disposed along the second direction DR2 in a pixel row PXR. Due to such an arrangement of the first light-emitting unit UA1 and the second light-emitting unit UA2, the third light-emitting region LA3 of the first light-emitting unit UA1 and the third light-emitting region LA3 of the second light-emitting unit UA2 are arranged according to a predetermined rule.

The distance between neighboring third light-emitting regions LA3 may vary depending on the arrangement of the first light-emitting unit UA1 and the second light-emitting unit UA2 neighboring each other in the first direction DR1. As the first light-emitting unit UA1 and the second light-emitting unit UA2 are alternately disposed in the first direction DR1, a first portion PT1 in which the third light-emitting region LA3 of the first light-emitting unit UA1 and the third light-emitting region LA3 of the second light-emitting unit UA2 are spaced apart from each other by a first distance DT1 and a second portion PT2 in which the third light-emitting region LA3 of the first light-emitting unit UA1 and the third light-emitting region LA3 of the second light-emitting unit UA2 are spaced apart from each other by a third distance DT1-X that is smaller than the first distance DT1 may be alternately positioned. The first portion PT1 and the second portion PT2 may be alternately positioned in each of the first direction DR1 and the second direction DR2.

In addition, according to the arrangement of the first light-emitting unit UA1 and the second light-emitting unit UA2 may be adjacent to each other in the first direction DR1, the second light-emitting region LA2 of the first light-emitting unit UA1 and the first light-emitting region LA1 of the second light-emitting unit UA2 may be spaced apart from each other by a second distance DT2. The second distance DT2 may be smaller than the first distance DT1.

In an embodiment of the inventive concept, the second distance DT2 may be substantially equal to the third distance DT1-X. However, the embodiment of the inventive concept is not necessarily limited thereto.

FIG. 4B is a plan view illustrating a display region of the display device according to an embodiment of the inventive concept, which has an arrangement of the light-emitting regions, which is different from the arrangement of FIG. 4A. Referring to FIG. 4B, one type of light-emitting units UA0 may be disposed in the display region 100-DAa. One light-emitting unit UA0 may include a first light-emitting region LA1 and a third light-emitting region LA3 spaced apart from each other in the first direction DR1 and two second light-emitting regions LA2 spaced apart from each other in the second direction DR2.

In one light-emitting unit UA0, four light-emitting regions LA1, LA2, and LA3 may be arranged in a diamond shape. The light-emitting units UA0 of pixel rows PXR are arranged along the second direction DR2. The light-emitting units UA0 of adjacent pixel rows PXR may be staggered from each other along the second direction DR2. The light-emitting units UA0 of adjacent pixel columns PXC may be staggered from each other along the first direction DR1.

In an embodiment of the inventive concept illustrated in FIG. 4B, a first distance DT1-*a* between two second light-emitting regions LA2 neighboring each other in the first direction DR1 may be larger than a second distance DT2-*a* between the first light-emitting region LA1 and the third light-emitting region LA3 neighboring each other in the first direction DR1.

Referring to FIGS. 4A and 4B, the display device, according to an embodiment of the inventive concept, may include a plurality of light-emitting regions LA1, LA2, and LA3 disposed in the display regions 100-DA and 100-DAa. The light-emitting regions LA1, LA2, and LA3 may be spaced apart from each other in the first direction DR1. In addition, in an embodiment of the inventive concept, some of the light-emitting regions neighboring each other in the first direction DR1 may be spaced apart from each other by a first distance DT1 or DT1-*a*, and other light-emitting regions neighboring each other in the first direction DR1 may be spaced apart from each other by a second distance DT2 or DT2-*a*. The first distance DT1 or DT1-*a* may be larger than the second distance DT2 or DT2-*a*.

The arrangements of the light-emitting regions illustrated in FIGS. 4A and 4B are examples, and the arrangements of the plurality of light-emitting regions, the shapes and types of the light-emitting units, and the like are not necessarily limited to those illustrated in FIGS. 4A and 4B. The arrangement form of a plurality of light-emitting regions that emit light in different wavelength ranges may be variously modified depending on display quality required for the display device, the size and intended use of the display device, and the like.

Figure 5:
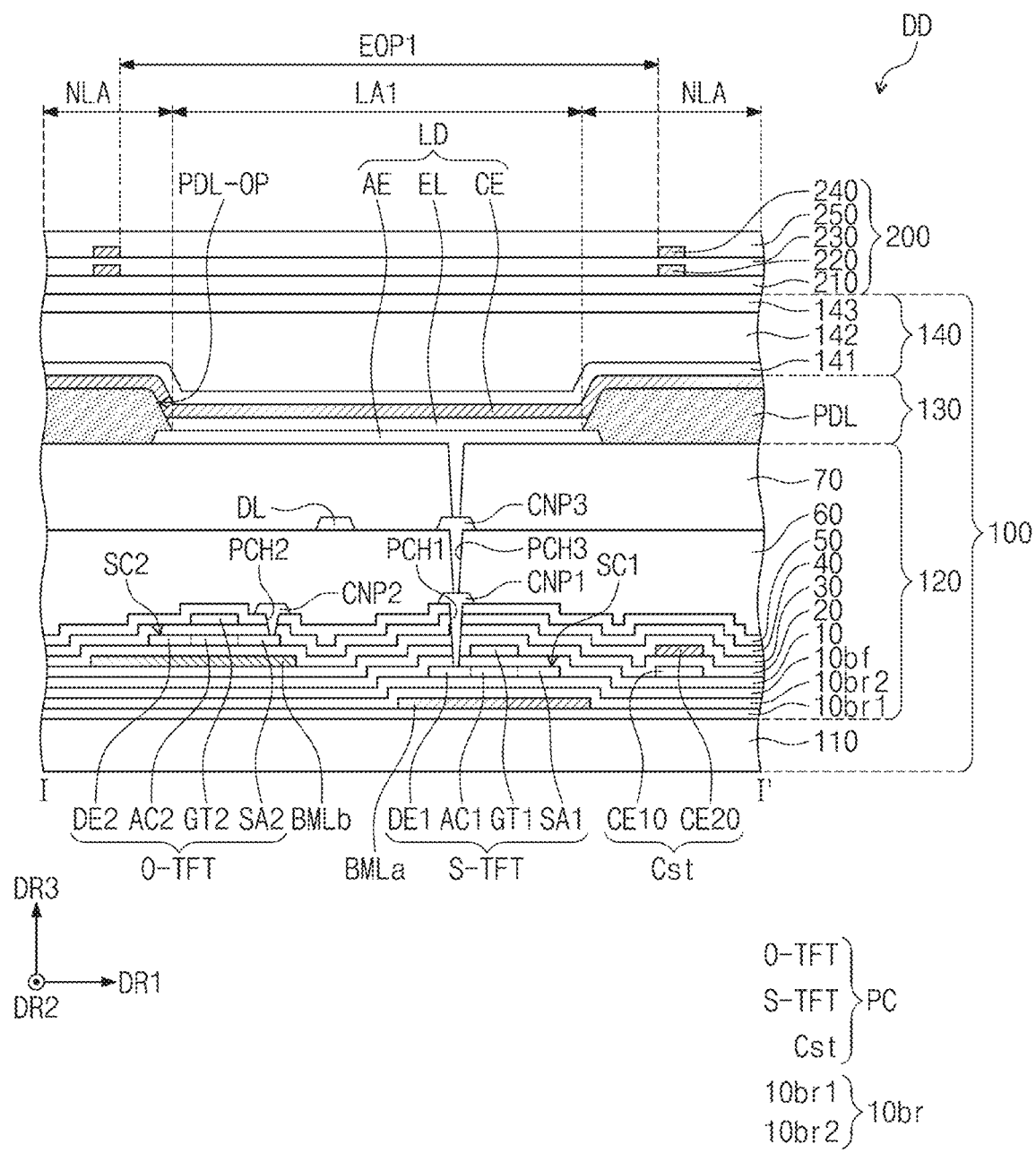
FIG. 5 is a cross-sectional view of a portion of the display device according to an embodiment of the inventive concept.

FIG. 5 is a cross-sectional view of the display device DD according to an embodiment of the inventive concept. FIG. 5 may be a cross-sectional view of a portion corresponding to line I-I' of FIG. 4A. In the illustration of FIG. 5, some components of the display device DD, such as the light controller 300, the adhesive layer PSA, and the window WM of FIG. 2, are omitted.

The display panel 100 may include a base layer 110, a circuit element layer 120, a display element layer 130 including a light-emitting element LD, and an encapsulation layer 140 covering the light-emitting element LD.

The circuit element layer 120 may include a pixel driving circuit PC that drives the light-emitting element LD. The pixel driving circuit PC may include a plurality of pixel driving elements. The pixel driving circuit PC may include a plurality of transistors S-TFT and O-TFT and a capacitor Cst. In FIG. 5, a silicon transistor S-TFT and an oxide transistor O-TFT are illustrated as examples of transistors. The pixel driving circuit PC illustrated in FIG. 5 is only an example, and the configuration of the pixel driving circuit PC is not necessarily limited thereto. The pixel driving circuit PC may include the silicon transistor S-TFT or the oxide transistor O-TFT.

Referring to FIG. 5, the base layer 110 is illustrated as a single layer. The base layer 110 may include a synthetic resin such as polyimide. In an embodiment of the inventive concept, the base layer 110 may have a multi-layered structure including a first synthetic resin layer, at least one inorganic layer, and a second synthetic resin layer.

The circuit element layer 120 may include a plurality of insulating layers, a plurality of semiconductor patterns, a plurality of conductive patterns, connection patterns, and the like.

Referring to FIG. 5, the circuit element layer 120 may include a barrier layer 10*br* disposed on the base layer 110. The barrier layer 10*br* can prevent foreign substances from entering. The barrier layer 10*br* may include at least one inorganic layer. The barrier layer 10*br* may include a silicon oxide layer and a silicon nitride layer. Each of these layers may be provided in plural, and silicon oxide layers and silicon nitride layers may be alternately stacked.

The barrier layer 10*br* may include a lower barrier layer 10*br*1 and an upper barrier layer 10*br*2. A first shielding electrode BMLa may be disposed between the lower barrier layer 10*br*1 and the upper barrier layer 10*br*2. The first shielding electrode BMLa may correspond to the silicon transistor S-TFT. The first shielding electrode BMLa may include a metal such as molybdenum.

The first shielding electrode BMLa may receive a bias voltage. The first shielding electrode BMLa may also receive the first power voltage. The first shielding electrode BMLa may block an electric potential due to polarization from affecting the silicon transistor S-TFT. The first shielding electrode BMLa may block external light from reaching the silicon transistor S-TFT. In an embodiment of the inventive concept, the first shielding electrode BMLa may be a floating electrode isolated from other electrodes or lines.

A buffer layer 10*bf* may be disposed on the barrier layer 10*br*. The buffer layer 10*bf* may prevent metal atoms or impurities from diffusing from the base layer 110 to a first semiconductor pattern SC1 disposed thereabove. The buffer layer 10*bf* may include at least one inorganic layer. The buffer layer 10*bf* may include a silicon oxide layer and a silicon nitride layer.

The first semiconductor pattern SC1 may be disposed on the buffer layer 10*bf*. The first semiconductor pattern SC1 may include a silicon semiconductor. For example, the silicon semiconductor may include amorphous silicon, polycrystalline silicon, and the like. For example, the first semiconductor pattern SC1 may include low-temperature polysilicon. As used herein, a low-temperature polysilicon (LTPS) is a polysilicon that is produced by annealing amorphous silicon at relatively low temperatures (typically around 450° C. to 600° C.) using techniques such as laser annealing. This process transforms the amorphous silicon into polycrystalline silicon with improved electrical properties.

The first semiconductor pattern SC1 may have different electrical properties depending on whether or not it is doped. The first semiconductor pattern SC1 may include a first region with high conductivity and a second region with low conductivity. The first region may be doped with an N-type dopant or a P-type dopant. The second region may be an undoped region or a region doped at a lower concentration than the first region. A source region SA1, a channel region AC1 (or active region), and a drain region DE1 of the silicon transistor S-TFT may be formed from the first semiconductor pattern SC1. The source region SA1 and the drain region DE1 may extend in opposite directions from each other from the channel region AC1 on a cross section.

A first insulating layer 10 may be disposed on the buffer layer 10bf. The first insulating layer 10 may cover the first semiconductor pattern SC1. The first insulating layer 10 may be an inorganic layer. The first insulating layer 10 may be a single layer of silicon oxide. Not only the first insulating layer 10 but also an inorganic layer of the circuit element layer 120 to be described later may have a single-layered or multi-layered structure and may include at least one of the above-described materials, but the embodiment of the inventive concept is not necessarily limited thereto.

A gate GT1 of the silicon transistor S-TFT is disposed on the first insulating layer 10. The gate GT1 may be a portion of a metal pattern. The gate GT1 may overlap the channel region AC1. In a process of doping the first semiconductor pattern SC1, the gate GT1 may serve as a mask.

A first capacitor electrode CE10 of a storage capacitor Cst may be disposed on the first insulating layer 10. Unlike what is illustrated in FIG. 5, the first capacitor electrode CE10 may have an integral shape with the gate GT1. As used herein, the phrase "integral shape" may mean that the structure in question is formed as a single continuous unit without breaks or divisions.

A second insulating layer 20 may be disposed on the first insulating layer 10 and may cover the gate GT1. In an embodiment of the inventive concept, an upper electrode that overlaps the gate GT1 may be further disposed on the second insulating layer 20. A second capacitor electrode CE20 overlapping the first capacitor electrode CE10 may be disposed on the second insulating layer 20. The upper electrode may have an integral shape with the second capacitor electrode CE20 in a plan view.

A second shielding electrode BMLb may be disposed on the second insulating layer 20. The second shielding electrode BMLb may correspond to the oxide transistor O-TFT. In an embodiment of the inventive concept, the second shielding electrode BMLb may be omitted. According to an embodiment of the inventive concept, the first shielding electrode BMLa may extend below the oxide transistor O-TFT and replace the second shielding electrode BMLb.

A third insulating layer 30 may be disposed on the second insulating layer 20. A second semiconductor pattern SC2 may be disposed on the third insulating layer 30. The second semiconductor pattern SC2 may include a channel region AC2 of the oxide transistor O-TFT. The second semiconductor pattern SC2 may include a metal oxide semiconductor. The second semiconductor pattern SC2 may include a transparent conductive oxide (TCO) such as indium tin oxide (ITO), indium zinc oxide (IZO), indium gallium zinc oxide (IGZO), zinc oxide (ZnOx), or indium oxide ($In_2O_3$).

The metal oxide semiconductor may include a plurality of regions SA2, AC2, and DE2 divided depending on whether or not the transparent conductive oxide has been reduced. A region (hereinafter referred to as a reduced region) in which the transparent conductive oxide is reduced has greater conductivity than a region (hereinafter referred to as a non-reduced region) in which the transparent conductive oxide is not reduced. The reduced region substantially serves as a source/drain or signal line of a transistor. The non-reduced region substantially corresponds to a semiconductor region (or channel) of a transistor. A fourth insulating layer 40 may be disposed on the third insulating layer 30. As illustrated in FIG. 5, the fourth insulating layer 40 may cover the second semiconductor pattern SC2. In an embodiment of the inventive concept, the fourth insulating layer 40 may be an insulating pattern which overlaps a gate GT2 of the oxide transistor O-TFT and is exposed by the source region SA2 and drain region DE2 of the oxide transistor O-TFT.

The gate GT2 of an oxide transistor O-TFT may be disposed on the fourth insulating layer 40. The gate GT2 of the oxide transistor O-TFT may be a portion of a metal pattern. The gate GT2 of the oxide transistor O-TFT overlaps the channel region AC2. A fifth insulating layer 50 may be disposed on the fourth insulating layer 40, and the fifth insulating layer 50 may cover the gate GT2. Each of the first to fifth insulating layers 10 to 50 may be an inorganic layer.

A first connection pattern CNP1 and a second connection pattern CNP2 may be disposed on the fifth insulating layer 50. Since the first connection pattern CNP1 and the second connection pattern CNP2 are formed through a same process, they may have a same material and a same stacked structure. The first connection pattern CNP1 may be connected to the drain region DE1 of the silicon transistor S-TFT through a first pixel contact hole PCH1 passing through the first to fifth insulating layers 10, 20, 30, 40, and 50. The second connection pattern CNP2 may be connected to the source region SA2 of the oxide transistor O-TFT through a second pixel contact hole PCH2 passing through the fourth and fifth insulating layers 40 and 50. The connection relationships of the first connection pattern CNP1 and the second connection pattern CNP2 with respect to the silicon transistor S-TFT and the oxide transistor O-TFT is not necessarily limited thereto.

A sixth insulating layer 60 may be disposed on the fifth insulating layer 50. A third connection pattern CNP3 may be disposed on the sixth insulating layer 60. The third connection pattern CNP3 may be connected to the first connection pattern CNP1 through a third pixel contact hole PCH3 passing through the sixth insulating layer 60. A data line DL may be disposed on the sixth insulating layer 60. A seventh insulating layer 70 may be disposed on the sixth insulating layer 60 and may cover the third connection pattern CNP3 and the data line DL. Since the third connection pattern CNP3 and the data line DL are formed through a same process, they may have a same material and a same stacked structure. Each of the sixth insulating layer 60 and the seventh insulating layer 70 may be an organic layer.

The display element layer 130 may be disposed on the circuit element layer 120. The display element layer 130 may include a light-emitting element LD and a pixel defining film PDL. The light-emitting element LD may include a first electrode AE, a second electrode CE facing the first electrode AE, and a light-emitting layer EL disposed between the first electrode AE and the second electrode CE.

A light-emitting opening PDL-OP, which exposes a portion of the upper surface of the first electrode AE, may be defined in the pixel defining film PDL. A light-emitting region LA1 may be defined to correspond to the light-emitting opening PDL-OP.

The first electrode AE of the light-emitting element LD may be disposed on the seventh insulating layer 70. The first electrode AE may be an anode or a cathode. In addition, the first electrode AE may be a pixel electrode. The first electrode AE may be a transmissive electrode, a semi-transmissive electrode, or a reflective electrode. The first electrode AE may include Ag, Mg, Cu, Al, Pt, Pd, Au, Ni, Nd, Ir, Cr, Li, Ca, LiF/Ca, LiF/Al, Mo, Ti, W, or a compound or mixture thereof (e.g., a mixture of Ag and Mg). Alternatively, the first electrode AE may have a multi-layered structure including: a reflective film or semi-transmissive film formed of the above materials; and a transparent conductive film formed of indium tin oxide (ITO), indium zinc oxide (IZO), zinc oxide (ZnO), indium tin zinc oxide (ITZO), and the like. For example, the first electrode AE may have a three-layer structure of ITO/Ag/ITO, but the embodiment of the inventive concept is not necessarily limited thereto. In addition, the embodiment of the inventive concept is not necessarily limited thereto, and the first electrode AE may include an above-described metal material, a combination of two or more metal materials selected from among the above-described metal materials, an oxide of the above-described metal materials, or the like.

The second electrode CE may be a cathode or an anode. The second electrode CE may be a common electrode. For example, when the first electrode AE is an anode, the second electrode CE may be a cathode, and when the first electrode AE is a cathode, the second electrode CE may be an anode.

The second electrode CE may be a transmissive electrode, a semi-transmissive electrode, or a reflective electrode. When the second electrode CE is a transmissive electrode, the second electrode CE may be composed of a transparent metal oxide such as indium tin oxide (ITO), indium zinc oxide (IZO), zinc oxide (ZnO), and indium tin oxide (ITZO). In addition, the second electrode CE may be formed by including Ag, Mg, Cu, Al, Pt, Pd, Au, Ni, Nd, Ir, Cr, Li, Ca, LiF/Ca, LiF/Al, Mo, Ti, W or a compound or mixture thereof (e.g., a mixture of Ag and Mg).

The light-emitting layer EL may have a light-emitting structure having a single layer or a plurality of light-emitting functional layers stacked on each other. The light-emitting layer EL may include an organic light-emitting material, an inorganic light-emitting material, or the like. The light-emitting layer EL may emit color light of any one of red, green, or blue. However, the embodiment of the inventive concept is not necessarily limited thereto, and the light-emitting layer EL may emit light of a color different from red, green, and blue, or may emit white light.

In FIG. 5 and the like, only the light-emitting layer EL disposed between the first electrode AE and the second electrode CE is illustrated as a component of the light-emitting element LD, but the light-emitting element LD may further include functional layers such as a hole transport region and an electron transport region. In an embodiment of the inventive concept, the hole transport region may be disposed between the first electrode AE and the light-emitting layer EL, and the electron transport region may be disposed between the light-emitting layer EL and the second electrode CE. The hole transport region may include a hole transport layer and may further include a hole injection layer. In addition, the electron transport region may include an electron transport layer and may further include an electron injection layer.

The pixel defining film PDL may be disposed on the seventh insulating layer 70. The pixel defining film PDL may have a single-layered or multi-layered structure. The pixel defining film PDL may be formed of polymer resin. For example, the pixel defining film PDL may be formed by including polyacrylate-based resin or polyimide-based resin. In addition, the pixel defining film PDL may be formed by further including an inorganic material besides the polymer resin. The pixel defining film PDL may be formed by including a light absorbing material or a black coloring agent. The black coloring agent may include black dye and black pigment. The black coloring agent may include carbon black, a metal such as chromium, or an oxide thereof, but the embodiment of the inventive concept is not necessarily limited thereto. The pixel defining film PDL formed by including black pigment or black dye may implement a black pixel defining film.

In addition, the pixel defining film PDL may be formed of an inorganic material. For example, the pixel defining film PDL may be formed of an inorganic material such as silicon nitride (SiNx), silicon oxide (SiOx), or silicon oxynitride (SiOxNy).

The pixel defining film PDL may cover a portion of the first electrode AE. For example, a light-emitting opening PDL-OP that exposes a portion of the first electrode AE may be defined in the pixel defining film PDL. A light-emitting region LA1 may be defined to correspond to the light-emitting opening PDL-OP. The non-light-emitting region NLA may be a portion that overlaps the pixel defining film PDL. The distance DT1, DT2, or DT1-X in one direction between the light-emitting regions compared in FIG. 4A and the like corresponds to the width in one direction of the pixel defining film that divides the light-emitting regions LA1, LA2, and LA3.

In FIG. 5, one light-emitting region LA1 corresponding to the first light-emitting region LA1 of FIG. 4A is illustrated as an example, but cross sections corresponding to the second light-emitting region LA2 (see FIG. 4A) and the third light-emitting region LA3 (see FIG. 4A) may also be substantially the same as that of FIG. 5.

However, the second light-emitting region LA2 (see FIG. 4A) and the third light-emitting region LA3 (FIG. 4A) may emit light in a wavelength range that is different from that of the first light-emitting region LA1. For example, the first light-emitting region LA1, the second light-emitting region LA2 (see FIG. 4A), and the third light-emitting region LA3 (see FIG. 4A) may respectively include light-emitting materials that emit different color light in the light-emitting layer EL.

The encapsulation layer 140 may cover the light-emitting element LD. The encapsulation layer 140 may include an inorganic encapsulation layer 141, an organic encapsulation layer 142, and an inorganic encapsulation layer 143 which are sequentially stacked. However, layers constituting the encapsulation layer 140 are not necessarily limited thereto. The inorganic encapsulation layers 141 and 143 may include a silicon nitride layer, a silicon oxynitride layer, a silicon oxide layer, a titanium oxide layer, an aluminum oxide layer, or the like. Each of the inorganic encapsulation layers 141 and 143 may have a multi-layered structure. The organic encapsulation layer 142 may include an acrylic-based organic layer, but is not necessarily limited thereto.

The input sensor 200 may be disposed on the display panel 100. The input sensor 200 may be disposed directly on the display panel 100.

The input sensor 200 includes a plurality of conductive patterns. The input sensor 200 may include at least one conductive layer (or at least one sensor conductive layer) including a plurality of conductive patterns and at least one insulating layer (or at least one sensor insulating layer). In an embodiment of the inventive concept, the input sensor 200 may include a first insulating layer 210 (or a first sensor insulating layer), a first conductive layer 220 (or a first sensor conductive layer), a second insulating layer 230 (or a second sensor insulating layer), a second conductive layer 240 (or a second sensor conductive layer), and a third insulating layer 250 (or a third sensor insulating layer). FIG. 5 illustrates a plurality of conductive patterns included in each of the first conductive layer 220 (or a first sensor conductive layer) and the second conductive layer 240 (or a second sensor conductive layer).

The first insulating layer 210 may be disposed directly on the display panel 100. The first insulating layer 210 may provide a base surface on which sensing electrodes SE1 and SE2 (see FIG. 6) and signal lines SL1 and SL2 (see FIG. 6) of the input sensor 200 are disposed. In an embodiment of the inventive concept, the first insulating layer 210 may be disposed directly on the encapsulation layer 140. Without necessarily being limited thereto, however, the first insulating layer 210 may be omitted, and the sensing electrodes and signal lines of the input sensor 200 may be disposed directly on the encapsulation layer 140.

The first insulating layer 210 may be an inorganic layer including silicon nitride, silicon oxynitride, and/or silicon oxide. Each of the first conductive layer 220 and the second conductive layer 240 may have a single-layered structure or a multi-layered structure in which layers are stacked along the third direction DR3. The first conductive layer 220 and the second conductive layer 240 may include conductive lines defining mesh-shaped electrodes. The conductive line of the first conductive layer 220 and the conductive line of the second conductive layer 240 may or might not be connected to each other through a contact hole passing through the second insulating layer 230 depending on the position thereof.

The first conductive layer 220 and the second conductive layer 240 having a single-layered structure may include a metal layer or a transparent conductive layer. The metal layer may include molybdenum, silver, titanium, copper, aluminum, or alloys thereof. The transparent conductive layer may include a transparent conductive oxide such as indium tin oxide (ITO), indium zinc oxide (IZO), zinc oxide (ZnOx), or indium zinc tin oxide (IZTO). In addition, the transparent conductive layer may include a conductive polymer such as PEDOT, metal nanowire, graphene, and the like.

The first conductive layer 220 and the second conductive layer 240 having a multi-layered structure may include metal layers. The metal layers may have, for example, a three-layer structure of titanium/aluminum/titanium. The multi-layered conductive layer may include at least one metal layer and at least one transparent conductive layer. The second insulating layer 230 may be disposed between the first conductive layer 220 and the second conductive layer 240. The third insulating layer 250 may cover the second conductive layer 240. In an embodiment of the inventive concept, the third insulating layer 250 may be omitted. The second insulating layer 230 and the third insulating layer 250 may include an inorganic layer or an organic layer.

Each of a plurality of conductive patterns of the first conductive layer 220 and a plurality of conductive patterns of the second conductive layer 240 may correspond to the non-light-emitting region NLA. The plurality of conductive patterns of the first conductive layer 220 and the second conductive layer 240 may correspond to a mesh pattern MP (see FIG. 7) that will be described later. The first conductive layer 220 and the second conductive layer 240 may include sensing electrodes SE1 and SE2 (see FIG. 6) which will be described later.

Figure 6:
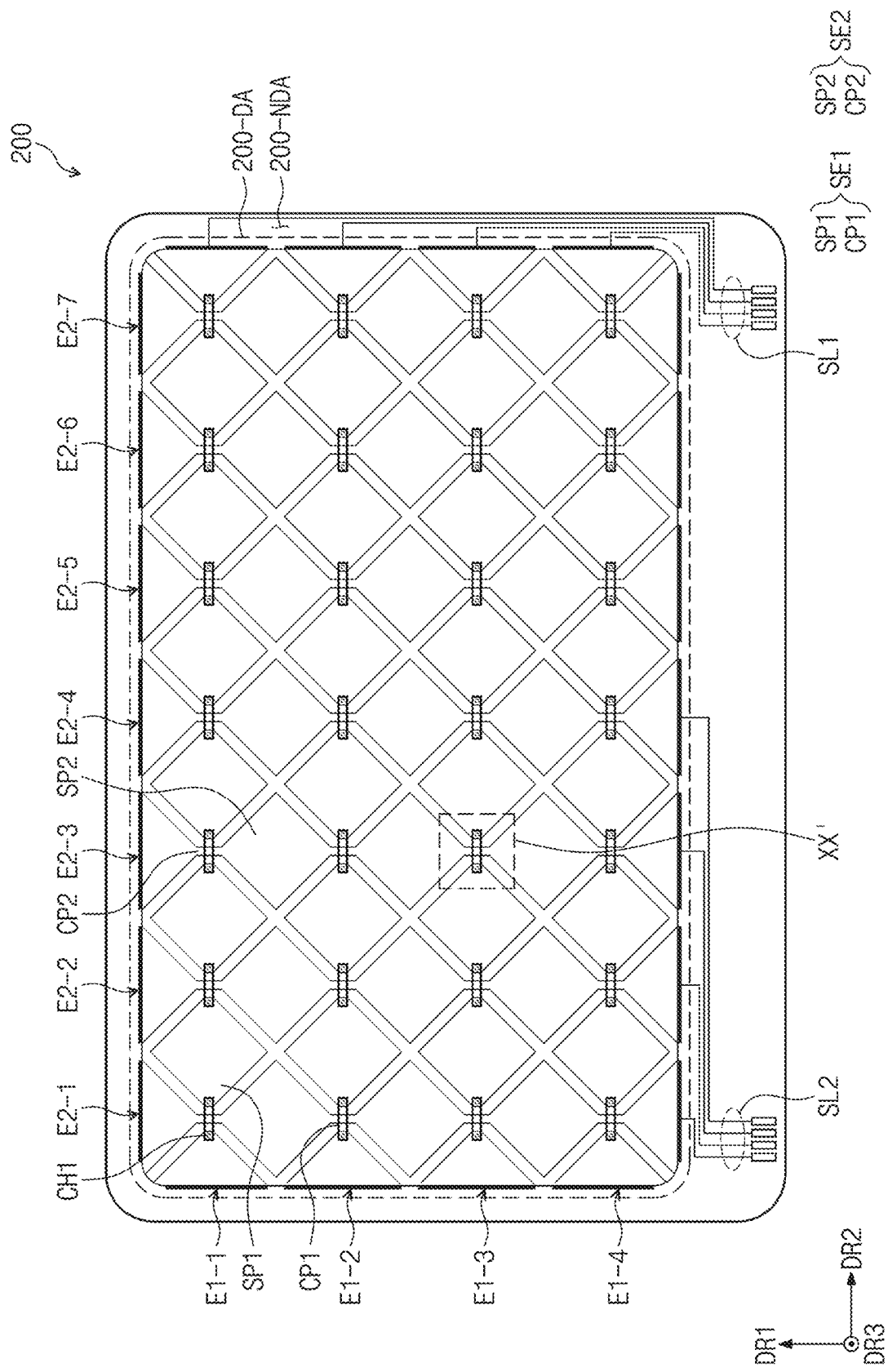
FIG. 6 is a plan view of an input sensor according to an embodiment of the inventive concept.

FIG. 6 is a plan view of the input sensor 200 according to an embodiment of the inventive concept.

Referring to FIG. 6, the input sensor 200 includes a sensing region 200-DA and a non-sensing region 200-NDA adjacent to the sensing region 200-DA. The sensing region 200-DA and the non-sensing region 200-NDA may respectively correspond to the display region 100-DA and the non-display region 100-NDA illustrated in FIG. 3.

The input sensor 200 includes the plurality of conductive patterns described above. The plurality of conductive patterns may include first electrodes SE1 (or first sensing electrodes), second electrodes SE2 (or second sensing electrodes), first signal lines SL1 (or first sensor signal lines), and second signal lines SL2 (or second sensor signal lines).

The first and second sensing electrodes SE1 and SE2 insulated from and crossing each other may be disposed in the sensing region 200-DA. The first signal lines SL1 connected to the first sensing electrodes SE1 and second signal lines SL2 electrically connected to the second sensing electrodes SE2 may be disposed in the non-sensing region 200-NDA. Any one of the first signal lines SL1 and the second signal lines SL2 transmits a driving signal for sensing an external input from an external circuit to corresponding sensing electrodes, and the other thereof outputs a sensing signal. Based on the sensing signal, a change in capacitance between the first and second sensing electrodes SE1 and SE2 is measured. In this embodiment, a mutual cap type input sensor is illustrated as an example, but the embodiment of the inventive concept is not necessarily limited thereto. A self-cap type input sensor may also be applied. The self-cap type input sensor may include one type of sensing electrodes.

The first sensing electrodes SE1 may be provided in a plurality of rows. The first sensing electrodes SE1 may include a first row sensing electrode E1-1, a second row sensing electrode E1-2, a third row sensing electrode E1-3, and a fourth row sensing electrode E1-4. Unlike the illustration of FIG. 6, the first sensing electrodes SE1 may include two or three row sensing electrodes, or may include five or more row sensing electrodes.

The second sensing electrodes SE2 may be provided in a plurality of columns. The second sensing electrodes SE2 may include a first column sensing electrode E2-1, a second column sensing electrode E2-2, a third column sensing electrode E2-3, a fourth column sensing electrode E2-4, a fifth column sensing electrode E2-5, a sixth column sensing electrode E2-6, and a seventh column sensing electrode E2-7. Unlike the illustration of FIG. 6, the second sensing electrodes SE2 may include six or fewer column sensing electrodes, or may include eight or more column sensing electrodes.

Each of the first sensing electrodes SE1 and the second sensing electrodes SE2 may have a mesh shape having a plurality of opening regions defined therein. The plurality of opening regions may overlap corresponding light-emitting regions among the plurality of light-emitting regions LA1, LA2, and LA3 (see FIG. 4A or 4B). The second sensing electrodes SE2 are insulated from and cross the first sensing electrodes SE1. The mesh shape of each of the first and second sensing electrodes SE1 and SE2 will be described later.

Any one of the first sensing electrodes SE1 and the second sensing electrodes SE2 may have an integral shape. In this embodiment, the second sensing electrodes SE2 are exemplarily illustrated as having an integral shape.

The second sensing electrodes SE2 may include second sensing patterns SP2 and connection patterns CP2. The second sensing patterns SP2 may have a larger area than the connection patterns CP2 and may have a diamond shape. Each of the connection patterns CP2 is disposed between two adjacent second sensing patterns SP2 among the second sensing patterns SP2. The length of the connection patterns CP2 may be shorter than that of the second sensing patterns SP2.

Each of the first sensing electrodes SE1 may include first sensing patterns SP1 and bridge patterns CP1. Two adjacent first sensing patterns SP1 may be connected to two bridge patterns CP1, but the number of the bridge patterns connecting the two adjacent first sensing patterns SP1 to each other is not necessarily limited thereto.

In an embodiment of the inventive concept, each of the first signal lines SL1 and the second signal lines SL2 of FIG. 6 may be formed from the first conductive layer 220 of FIG. 5. Without necessarily being limited thereto, however, each of the first signal lines SL1 and the second signal lines SL2 may be formed from the second conductive layer 240. Each of the first signal lines SL1 and the second signal lines SL2 may have a dual line structure including both a line formed from the first conductive layer 220 and a line formed from the second conductive layer 240.

Figure 7:
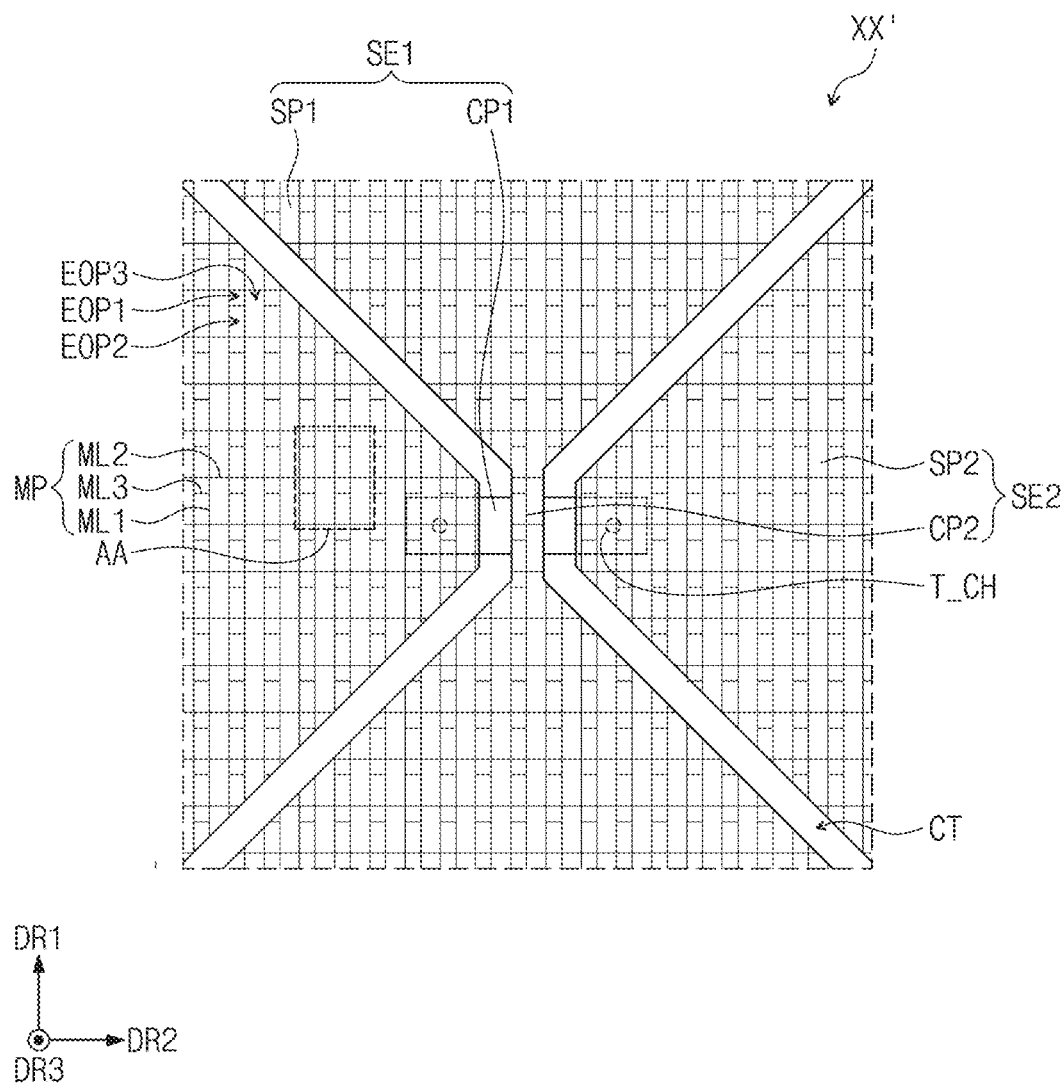
FIG. 7 is an enlarged plan view of a portion of the input sensor according to an embodiment of the inventive concept.

FIG. 7 is an enlarged plan view of a portion of the input sensor according to an embodiment of the inventive concept. FIG. 7 may correspond to region XX' of FIG. 6.

Referring to FIGS. 6 and 7, each of the sensing patterns SP1 and SP2 may include a mesh pattern MP. The mesh pattern MP may include a plurality of mesh lines ML1, ML2, and ML3 defining a plurality of opening regions EOP1, EOP2, and EOP3.

The plurality of mesh lines may include a first mesh line ML1 extending in the first direction DR1 and a second mesh line ML2 extending in the second direction DR2. In addition, the plurality of mesh lines may further include a third mesh line ML3 extending in the second direction DR2. The third mesh line ML3 may be disposed between two neighboring second mesh lines ML2. The third mesh line ML3 may be positioned between the first light-emitting region LA1 (see FIG. 4A) and the second light-emitting region LA2 (see FIG. 4A). In an embodiment of the inventive concept, the first mesh line ML1, the second mesh line ML2, and the third mesh line ML3 may be connected to each other and have an integral shape.

Each of the first mesh lines ML1 may extend in the first direction DR1, and the first mesh lines ML1 may be spaced apart from each other in the second direction DR2. Each of the second mesh lines ML2 may extend in the second direction DR2, and the second mesh lines ML2 may be spaced apart from each other in the first direction DR1. The second mesh lines ML2 may cross the first mesh lines ML1 in a plan view and have an integral shape. In addition, each of the third mesh lines ML3 may extend in the second direction DR2, and the third mesh lines ML3 may be arranged in the first direction DR1 and the second direction DR2. The third mesh lines ML3 may be alternately arranged with the second mesh lines ML2 in the first direction DR1.

The mesh pattern MP may include first to third opening regions EOP1, EOP2, and EOP3 defined by the first to third mesh lines ML1, ML2, and ML3. In an embodiment of the inventive concept illustrated in FIG. 7, each of the first opening region EOP1 and the second opening region EOP2 may be surrounded by the first to third mesh lines ML1, ML2, and ML3. The third opening region EOP3 may be surrounded by the first mesh line ML1 and the second mesh line ML2.

In an embodiment of the inventive concept, the first to third opening regions EOP1, EOP2, and EOP3 may have different areas in a plan view. For example, in an embodiment of the inventive concept illustrated in FIG. 7, on a plane defined by the first direction DR1 and the second direction DR2, the third opening region EOP3 may have the largest area among the first to third opening regions EOP1, EOP2, and EOP3, and the first opening region EOP1 may have the smallest area among the first to third opening regions EOP1, EOP2, and EOP3. The first and second opening regions EOP1 and EOP2 and the third opening regions EOP3 may be alternately formed along the second direction DR2. One third opening region EOP3 may overlap each of the first opening region EOP1 and the second opening region EOP2 in the second direction DR2.

Regions in which the first to third opening regions EOP1, EOP2, and EOP3 are defined may respectively overlap the first to third light-emitting regions LA1, LA2, and LA3 (see FIG. 4A). However, the embodiment of the inventive concept is not necessarily limited thereto, and the areas of the first to third opening regions EOP1, EOP2, and EOP3 vary depending on the shapes and the like of the first to third light-emitting regions LA1, LA2, and LA3 (see FIG. 4A).

The shape of the mesh pattern MP illustrated in FIG. 7 is an example, and the arrangement and shape of the first to third mesh lines ML1, ML2, and ML3 and the first to third opening regions EOP1, EOP2, and EOP3 in the mesh pattern MP may be variously modified depending on the arrangement and shape of the pixels PX (see FIG. 3) of the display panel 100 (see FIG. 3).

A cut portion may be defined in at least any one of the first mesh lines ML1, the second mesh lines ML2, and the third mesh lines ML3 included in each of the first sensing pattern SP1 and the second sensing pattern SP2. In an embodiment of the inventive concept, the first sensing pattern SP1 and the second sensing pattern SP2 adjacent thereto may be spaced apart and electrically insulated from each other, and the cut portion may include a boundary cut portion CT defined between the first sensing pattern SP1 and the second sensing pattern SP2.

For the convenience of explanation, FIG. 7 exemplarily illustrates that the boundary cut portion CT having a constant distance is defined between the first and second sensing patterns SP1 and SP2. However, the shape of the boundary cut portion CT is not necessarily limited thereto, and the boundary cut portion CT may have a shape in which a portion of each of the first mesh lines ML1, the second mesh lines ML2, and the third mesh lines ML3 is removed.

Figure 8A:
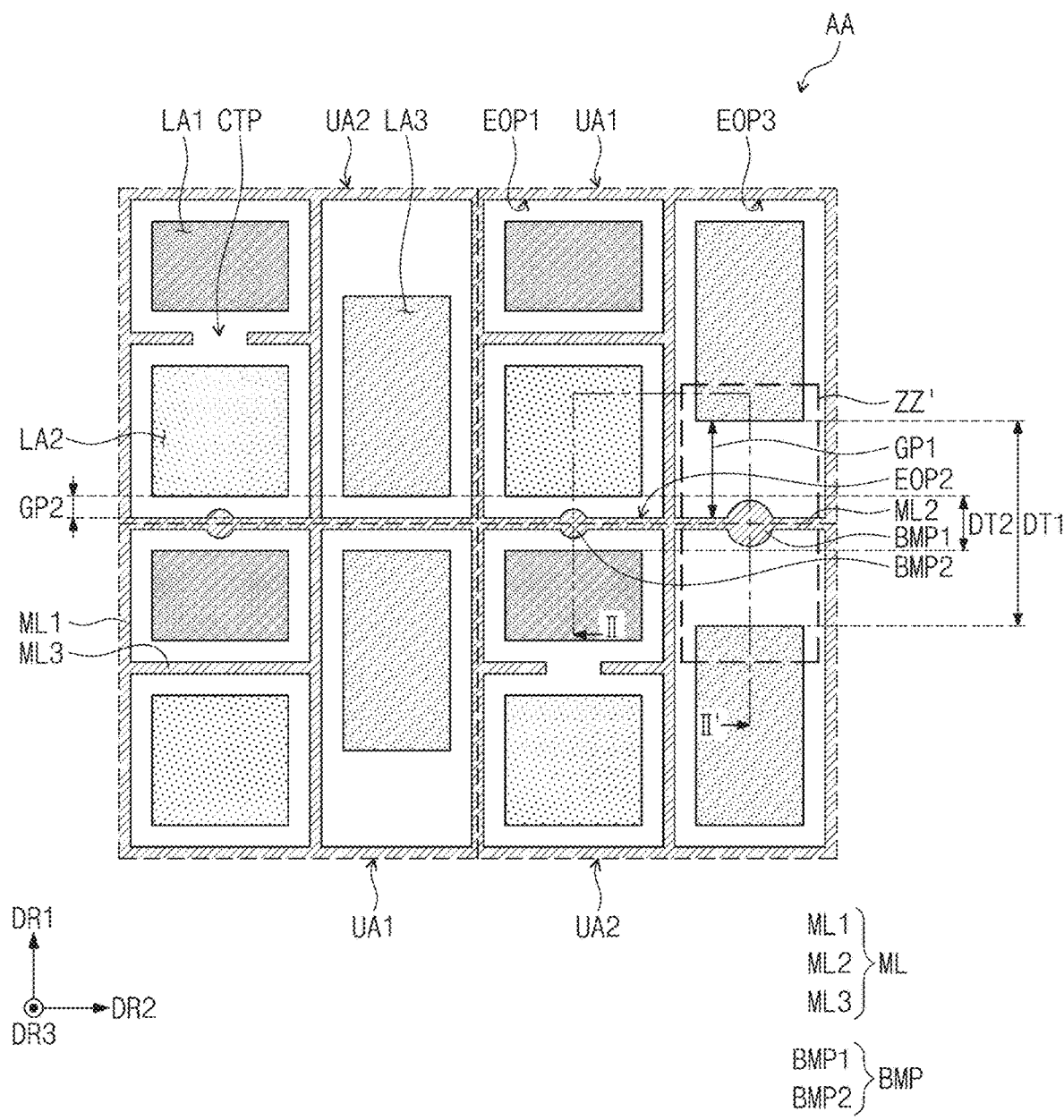
FIG. 8A is an enlarged plan view of a portion of the display device according to an embodiment of the inventive concept.
Figure 8B:
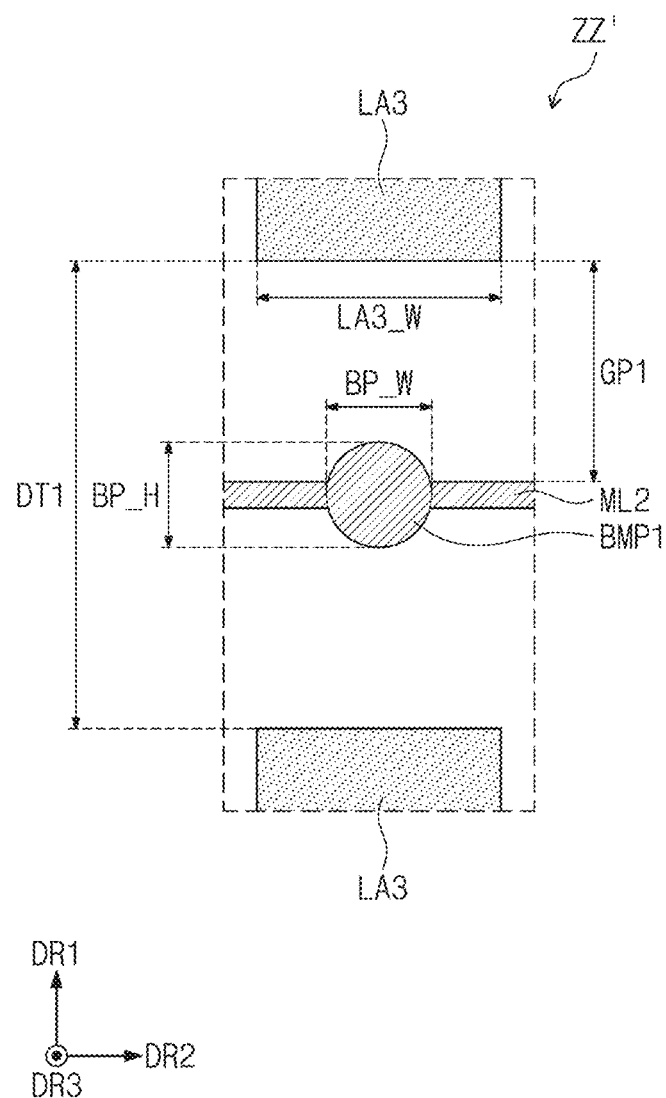
FIG. 8B is an enlarged plan view of a portion of the display device according to an embodiment of the inventive concept.

FIG. 8A is an enlarged plan view of a partial region of the display device according to an embodiment of the inventive concept. FIG. 8A may correspond to region AA of FIG. 7. FIG. 8B is an enlarged view of a portion of FIG. 8A. FIG. 8B may correspond to region ZZ' of FIG. 8A.

The embodiment illustrated in FIGS. 8A and 8B may have the configuration of the display region described with reference to FIG. 4A. In an embodiment of the inventive concept, the display device may include a plurality of light-emitting regions LA1, LA2, and LA3 that are spaced apart from each other. In an embodiment of the inventive concept, the first light-emitting unit UA1 and the second light-emitting unit UA2 may be adjacent to each other in each of the first direction DR1 and the second direction DR2.

In an embodiment of the inventive concept, the display device may include a plurality of mesh lines ML and a plurality of protruding portions BMP. The mesh lines ML and the protruding portions BMP may be included in the input sensor 200 (see FIG. 5). The protruding portions BMP may have a shape that protrudes inside the opening regions EOP1, EOP2, and EOP3 defined by the mesh lines ML. The protruding portions BMP may have a shape that protrudes from at least one of the mesh lines ML into the opening regions EOP1, EOP2, and EOP3. Each of the protruding portions BMP may be formed integrally with the mesh lines ML.

The mesh line ML and the protruding portions BMP may be disposed on the same layer as at least one of the first conductive layer 220 (see FIG. 5) and the second conductive layer 240 (see FIG. 5). In an embodiment of the inventive concept, the mesh line ML and the protruding portion BMP may be disposed on the same layer as the second conductive layer 240 (see FIG. 5).

One embodiment may further include a cut portion CTP defined in at least one of the mesh lines ML. The cut portion CTP may be defined on the same layer as at least one of the first conductive layer 220 (see FIG. 5) and the second conductive layer 240 (see FIG. 5). In an embodiment of the inventive concept, the cut portion CTP may be defined in the mesh line ML disposed on the same layer as the second conductive layer 240 (see FIG. 5). Referring to the embodiment illustrated in FIG. 8A, the cut portion CTP may be defined in the third mesh line ML3. However, the embodiment of the inventive concept is not necessarily limited thereto, and the cut portion CTP may also be additionally defined in the first mesh line ML1 or the second mesh line ML2.

In the display device, according to an embodiment of the inventive concept, as the input sensor 200 (see FIG. 5) includes the protruding portions BMP or the cut portion CTP, it is possible to reduce an extent to which a specific pattern is visible to a viewer due to the mesh lines ML or the boundary cut portion CT (see FIG. 7).

In an embodiment of the inventive concept, the protruding portion BMP may include a first protruding portion BMP1 disposed between the light-emitting regions spaced apart from each other by a first distance DT1 in the first direction DR1 and a second protruding portion BMP2 disposed between the light-emitting regions spaced apart from each other by a second distance DT2 in the first direction DR1. The first distance DT1 may be greater than the second distance DT2 and the planar area of the first protruding portion BMP1 may be larger than the planar area of the second protruding portion BMP2. The planar areas of the protruding portions BMP correspond to areas on a plane defined by the first direction DR1 and the second direction DR2.

In an embodiment of the inventive concept, as a separation distance between the light-emitting regions LA1, LA2, and LA3 increases, the area of the protruding portion BMP disposed between the light-emitting regions LA1, LA2, and LA3 spaced apart from each other may increase. In an embodiment of the inventive concept, as the distance between the light-emitting regions spaced apart from each other in one direction increases, the planar area of the protruding portion disposed between the light-emitting regions spaced apart from each other may increase.

Referring to FIG. 8A, the first protruding portion BMP1 may be disposed between the third light-emitting region LA3 of the first light-emitting unit UA1 and the third light-emitting region LA3 of the second light-emitting unit UA2. For example, the first protruding portion BMP1 may be disposed in a portion in which a separation distance between the light-emitting regions is relatively large. For example, the first protruding portion BMP1 may be disposed in the first portion PT1 (see FIG. 4A) described with reference to FIG. 4A. The first protruding portion BMP1 might not be disposed in the second portion PT2 (see FIG. 4A) in which a separation distance between the light-emitting regions is relatively small.

In an embodiment of the inventive concept, the protruding portions BMP may overlap the light-emitting regions LA1, LA2, and LA3 in a direction in which the difference in separation distance between the light-emitting regions LA1, LA2, and LA3 is large. Referring to FIG. 8A, the difference (difference of DT1 and DT2) in separation distance between the light-emitting regions LA1, LA2, and LA3 neighboring each other in the first direction DR1 may be larger than the difference in separation distance between the light-emitting regions LA1, LA2, and LA3 neighboring each other in the second direction DR2. Accordingly, the protruding portions BMP may overlap the light-emitting regions LA1, LA2, and LA3 in the first direction DR1. In addition, in an embodiment of the inventive concept, the protruding portions BMP might not be disposed between the light-emitting regions LA1, LA2, and LA3 neighboring each other in the second direction DR2.

In an embodiment of the inventive concept, in order to reduce the extent to which viewing angle differences reduce display quality (e.g., difference of DT1 and DT2) according to in separation distance between the light-emitting regions LA1, LA2, and LA3 neighboring each other in the first direction DR1, the first protruding portion BMP1 which has a relatively large size may be disposed between the light-emitting regions having a relatively large separation distance therebetween.

In the embodiment illustrated in FIGS. 8A and 8B, the first protruding portion BMP1 may be disposed between the third color light-emitting regions LA3 having a relatively large separation distance therebetween. The third color light-emitting region LA3 may be a blue light-emitting region. For example, the first protruding portion BMP1 may be disposed between the blue light-emitting regions, and for example, may be disposed in the first portion PT1 (see FIG. 4A) in which the separation distance between the blue light-emitting regions is large. In addition, the second protruding portion BMP2 may be disposed between the second color light-emitting region LA2 and the first color light-emitting region LA1. The second color light-emitting region may be a green light-emitting region, and the first color light-emitting region may be a red light-emitting region. For example, in the case of a display device having the arrangement of the light-emitting units illustrated in FIG. 4A, the first protruding portion BMP1 may be disposed between the blue light-emitting regions having a relatively large separation distance, and the second protruding portion BMP2 may overlap the first protruding portion BMP1 in the second direction DR2 between the green light-emitting region and the red light-emitting region.

For example, in the display device, according to an embodiment of the inventive concept, it is possible to reduce the extent to which viewing angles affect display quality according to a separation distance between the light-emitting regions by varying the sizes of the protruding portions, which are disposed between adjacent light-emitting regions, according to the difference in separation distance between adjacent light-emitting regions. Accordingly, as the display device, according to an embodiment of the inventive concept, includes a protruding portion having a relatively large area between the light-emitting regions having a relatively large separation distance therebetween, it is possible to adjust the viewing angle characteristics of light emitted from the light-emitting regions having a relatively large separation distance to a similar level to the viewing angle characteristics of light emitted from the light-emitting regions having a relatively small separation distance. Accordingly, the display device, according to an embodiment of the inventive concept, may exhibit excellent display quality as a color difference depending on a viewing angle is reduced even when the light-emitting regions are spaced apart from each other by different distances. This undesirable phenomenon by which the viewer observes color differences in the display panel as viewing angle changes is known as viewing angle color shift.

In an embodiment of the inventive concept, the first protruding portion BMP1 and the second protruding portion BMP2 may overlap each other in the second direction DR2. In addition, in an embodiment of the inventive concept including the cut portion CTP, the cut portion CTP may overlap the second protruding portion BMP2 in the first direction DR1. As the display device according to an embodiment of the inventive concept includes a first protruding portion BMP1, a second protruding portion BMP2, and a cut portion CTP, the display device may exhibit excellent display quality and a reduced color difference depending on a viewing angle.

In an embodiment of the inventive concept, the mesh lines ML may be disposed between the light-emitting regions LA1, LA2, and LA3. In an embodiment of the inventive concept, the mesh lines ML might not overlap the light-emitting regions LA1, LA2, and LA3 and be disposed on the pixel defining film PDL (see FIG. 5). In the case of the display device, according to an embodiment of the inventive concept, including the input sensor 200 (see FIG. 5), light emitted from the light-emitting regions LA1, LA2, and LA3 may be blocked or reflected by the mesh lines ML included in the conductive layers 220 and 240 (see FIG. 5). For example, the mesh lines ML may affect the light-emitting characteristics or light-emitting quality of the light-emitting regions LA1, LA2, and LA3 adjacent thereto.

When the plurality of light-emitting regions LA1, LA2, and LA3 are spaced apart from each other, the display device, according to an embodiment of the inventive concept, may include portions in which separation distances GP1 and GP2 between the light-emitting regions LA1, LA2, and LA3 and the mesh line ML according to the arrangement form of the light-emitting regions are different from each other. A viewing angle range in which the mesh line ML affects the characteristics of light emitted from the light-emitting regions LA1, LA2, and LA3 varies depending on the separation distances GP1 and GP2 between the light-emitting regions and the mesh line.

Referring to FIGS. 8A and 8B, the second mesh line ML2 disposed between the light-emitting regions LA3 spaced apart from each other by the first distance DT1 may be spaced apart from a neighboring third light-emitting region LA3 by a first separation distance GP1. In addition, the second mesh line ML2 disposed between the light-emitting regions LA2 and LA1 spaced apart from each other by the second distance DT2 may be spaced from a neighboring second light-emitting region LA2 by a second separation distance GP2.

The second mesh line ML2 may block light emitted in a vertical direction (a direction parallel to the first direction DR1 in the embodiment of FIG. 8A) among light emitted from the light-emitting regions LA1, LA2, and LA3 adjacent thereto. Accordingly, light blocking characteristics in which light emitted from the light-emitting regions LA1, LA2, and LA3 is blocked by the second mesh line ML2 may vary depending on a separation distance between the second mesh line ML2 and the light-emitting regions LA1, LA2, and LA3 adjacent thereto. For example, there may be a difference in a viewing angle at which light is blocked in a vertical direction (a direction parallel to the first direction DR1) in a portion in which the second mesh line ML2 is spaced apart from a neighboring second light-emitting region LA2 by the second separation distance GP2 and in a portion in which the second mesh line ML2 is spaced apart from a neighboring third light-emitting region LA3 by the first separation distance GP1.

The display device, according to an embodiment of the inventive concept, may include a second protruding portion BMP2 disposed in a portion in which the light-emitting region LA2 and the second mesh line ML2 are spaced apart from each other by the second separation distance GP2 and a first protruding portion BMP1 disposed in a portion in which the light-emitting region LA3 and the second mesh line ML2 are spaced apart from each other by the first separation distance GP1 larger than the second separation distance GP2. Each of the first protruding portion BMP1 and the second protruding portion BMP2 may have a shape protruding from the second mesh line ML2 toward neighboring light-emitting regions. In a plan view, the area of the first protruding portion BMP1 may be larger than the area of the second protruding portion BMP2. In addition, a size BP_H of the first protruding portion BMP1 in the first direction DR1 may be larger than the size of the second protruding portion BMP2 in the first direction DR1. As the first protruding portion BMP1 has a larger size than the second protruding portion BMP2, the difference between the separation distance between the first protruding portion BMP1 and the third light-emitting region LA3 and the separation distance between the second protruding portion BMP2 and the second light-emitting region LA2 may become smaller than the difference between the first separation distance GP1 and the second separation distance GP2. Accordingly, by disposing the first protruding portion BMP1, which has a larger area, in a plan view, or a larger size in the first direction DR1, in a portion in which a separation distance between the mesh line ML and the light-emitting region LA1, LA2, or LA3 is relatively large, it is possible to reduce the difference in viewing angle characteristics due to the difference in separation distance between the light-emitting region and the mesh line.

In an embodiment of the inventive concept, the area of the protruding portion disposed in a portion in which the separation distance between the mesh line and the light-emitting region is relatively large may be greater than the area of the protruding portion disposed in a portion in which the separation distance between the mesh line and the light-emitting region is relatively small. In addition, the size in one direction of the protruding portion disposed in a portion in which the separation distance in one direction between the mesh line and the light-emitting region is relatively large may be greater than the size in one direction of the protruding portion disposed in a portion in which the separation distance in one direction between the mesh line and the light-emitting region is relatively small. For example, in the display device according to an embodiment of the inventive concept, by varying the sizes of the protruding portions, which are disposed between the light-emitting regions and the mesh line, according to the separation distances between the light-emitting regions and the mesh line adjacent thereto, it is possible to reduce a color difference depending on a viewing angle although the light-emitting regions are spaced apart from each other by various distances, thus exhibiting excellent display quality.

In an embodiment of the inventive concept illustrated in FIGS. 8A and 8B, each of the first protruding portion BMP1 and the second protruding portion BMP2 is illustrated as having a circular shape in a plan view. However, this is an example and the first protruding portion BMP1 and the second protruding portion BMP2 may have different shapes, and the first protruding portion BMP1 and the second protruding portion BMP2 may have various shapes besides a circular shape. Each of the first protruding portion BMP1 and the second protruding portion BMP2 may have a circular, oval, tetragonal, or polygonal shape, or a combination of the above-described shapes.

In addition, in an embodiment of the inventive concept, the shapes of the first and second protruding portions BMP1 and BMP2 may be modified into various shapes corresponding to the shapes of the boundaries of neighboring light-emitting regions LA1, LA2, and LA3. For example, the edges of the protruding portions BMP may have shapes corresponding to the shapes of the boundaries of the light-emitting regions LA1, LA2, and LA3 so that the separation distances between adjacent light-emitting regions LA1, LA2, and LA3 are substantially the same as each other. However, the embodiment of the inventive concept is not necessarily limited thereto, and the shapes of the protruding portions BMP may be modified in various ways within the range of reducing the reflective visibility of the mesh lines ML and reducing a color difference depending on a viewing angle.

The size BP_H in the first direction DR1 of the first protruding portion BMP1 disposed between the light-emitting regions LA3 spaced apart from each other by the first distance DT1 may be smaller than the first distance DT1. In addition, a width BP_W of the first protruding portion BMP1 in the second direction DR2 may be smaller than a width LA3_W of the light-emitting region LA3 in the second direction DR2.

As one embodiment includes the first protruding portion BMP1 having the size BP_H in one direction, which is smaller than the first distance DT1 which is the separation distance between the light-emitting regions LA3, and having the width BP_W which is smaller than the width LA3_W of the light-emitting region LA3, it is possible to exhibit excellent display quality by adjusting light extraction characteristics depending on a viewing angle in a portion in which a separation distance between the light-emitting regions is relatively large.

Figure 9:
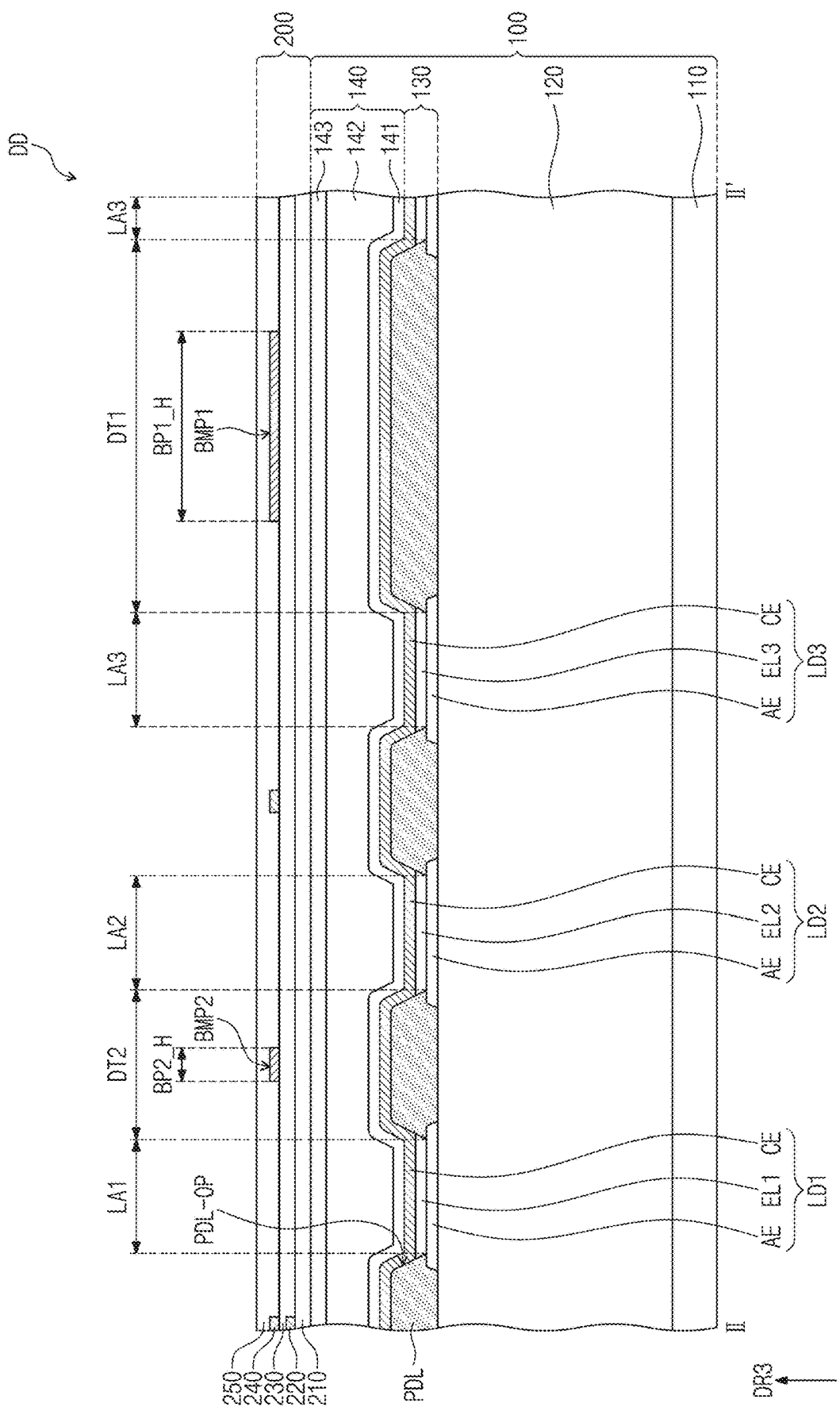
FIG. 9 is a cross-sectional view of a portion of the display device according to an embodiment of the inventive concept.

FIG. 9 is a cross-sectional view illustrating a portion of the display device according to an embodiment of the inventive concept. FIG. 9 may correspond to region II-II' of FIG. 8A. In FIG. 9, some components of the display device DD are omitted, and only the stacked structure of the display panel 100 and the input sensor 200 are illustrated. In addition, in FIG. 9, the configuration of the circuit element layer 120 is illustrated as one layer. The contents described with reference to FIG. 5 may be equally applied to the contents related to the configuration of the display panel 100 and the input sensor 200 in the display device according to an embodiment of the inventive concept described with reference to FIG. 9.

FIG. 9 illustrates a cross section of a portion including the first light-emitting region LA1, the second light-emitting region LA2, and the third light-emitting region LA3. The first light-emitting region LA1, the second light-emitting region LA2, and the third light-emitting region LA3 may emit light of different wavelength ranges.

The display element layer 130 may include a plurality of light-emitting elements LD1, LD2, and LD3 and a pixel defining film PDL. Light-emitting openings PDL-OP may be defined in the pixel defining film PDL. The first light-emitting element LD1 may include a first light-emitting layer EL1, the second light-emitting element LD2 may include a second light-emitting layer EL2, and the third light-emitting element LD3 may include a third light-emitting layer EL3. The first to third light-emitting layers EL1, EL2, and EL3 may include light-emitting materials that emit light of different wavelength ranges. The first light-emitting element LD1 may emit red light, the second light-emitting element LD2 may emit green light, and the third light-emitting element LD3 may emit blue light.

Referring to FIG. 9, the protruding portions BMP1 and BMP2 may be disposed on the pixel defining film PDL. The size BP1_H in one direction of the first protruding portion BMP1 disposed in a region in which the distance DT1 separated between the light-emitting regions is relatively large may be greater than the size BP2_H in one direction of the second protruding portion BMP2 disposed in a region in which the distance DT2 separated between the light-emitting regions is relatively small. Accordingly, as the difference between the distance in one direction between the edge of the first protruding portion BMP1 and the third light-emitting region LA3 and the distance in one direction between the edge of the second protruding portion BMP2 and the second light-emitting region LA2 is reduced, the degree of blocking light emitted from the light-emitting regions LA1, LA2, and LA3 and directed toward the protruding portions BMP1 and BMP2 and a light blocking viewing angle may appear at a similar level.

In an embodiment of the inventive concept, the protruding portions BMP1 and BMP2 may be disposed on the same layer as the second conductive layer 240. However, the embodiment of the inventive concept is not necessarily limited thereto, and the protruding portions BMP1 and BMP2 may be disposed on the same layer as the first conductive layer 220, or may be selectively disposed on the conductive layer 220 or the second conductive layer 240 according to an arrangement position on the display region.

Figure 10:
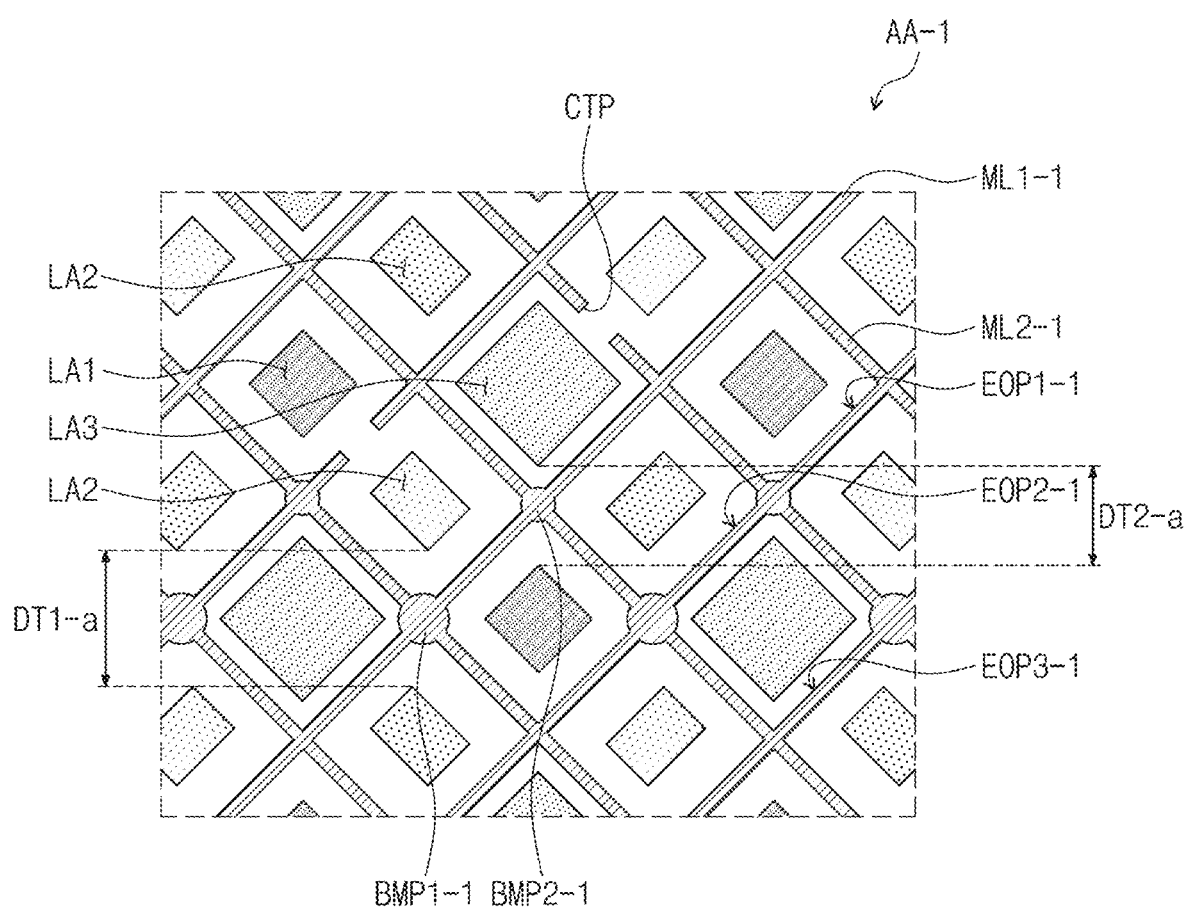
FIG. 10 is an enlarged plan view of a portion of the display device according to an embodiment of the inventive concept.

FIG. 10 is a plan view illustrating a portion of the display device according to an embodiment of the inventive concept. FIG. 10 illustrates a portion of the display device, which corresponds to the display region of FIG. 4B, and may be region AA-1 corresponding to region AA of FIG. 7.

The display device, according to an embodiment of the inventive concept, includes a plurality of light-emitting regions LA1, LA2, and LA3 and may include first to third opening regions EOP1-1, EOP2-1, and EOP3-1 that overlap the light-emitting regions LA1, LA2, and LA3. The first to third opening regions EOP1-1, EOP2-1, and EOP3-1 may be defined by a first mesh line ML1-1 and a second mesh line ML2-1.

The first mesh line ML1-1 may extend in a fourth direction DR4, and the second mesh line ML2-1 may extend in a fifth direction DR5 crossing the fourth direction DR4. The fourth direction DR4 may be a direction extending between the first direction DR1 and the second direction DR2. The first to third opening regions EOP1-1, EOP2-1, and EOP3-1 may be defined by the first mesh lines ML1-1 and the second mesh lines ML2-1, which cross each other.

Referring to FIGS. 4B and 10, in an embodiment of the inventive concept, the first distance DT1-a between the second light-emitting regions LA2 spaced apart from each other in the first direction DR1 may be larger than the second distance DT2-a between the third light-emitting region LA3 and the first light-emitting region LA1 spaced apart from each other in the first direction DR1. A first protruding portion BMP1-1 may be disposed between the second light-emitting regions LA2 spaced apart from each other by the first distance DT1-a, and a second protruding portion BMP2-1 may be disposed between the third light-emitting region LA3 and the first light-emitting region LA1 spaced apart from each other by the second distance DT2-a. In a plan view, the area of the first protruding portion BMP1-1 may be larger than the area of the second protruding portion BMP2-1. In addition, the size of the first protruding portion BMP1-1 in the first direction DR1 may be larger than the size of the second protruding portion BMP2-1 in the first direction DR1.

In an embodiment of the inventive concept illustrated in FIG. 10, among deviations of the separation distances between the light-emitting regions LA1, LA2, and LA3, a deviation in the first direction DR1 may be larger than a deviation in the second direction DR2, the fourth direction DR4, or the fifth direction DR5. Accordingly, the protruding portions BMP1-1 and BMP2-1 may overlap the light-emitting regions LA1, LA2, and LA3 in the first direction DR1.

Even in this case, however, when viewed on a plane perpendicular to the third direction DR3, the protruding portions BMP1-1 and BMP2-1 do not overlap the light-emitting regions LA1, LA2, and LA3 adjacent thereto. For example, the size in the second direction DR2 of the first protruding portion BMP1-1 disposed between two second light-emitting regions LA2 adjacent to each other in the first direction DR1 may be smaller than the separation distance between the first light-emitting region LA1 and the third light-emitting region LA3 adjacent to each other in the second direction DR2. In addition, the size in the first direction DR1 of the second protruding portion BMP2-1 disposed between two second light-emitting regions LA2 adjacent to each other in the second direction DR2 may be smaller than the separation distance between the first light-emitting region LA1 and third light-emitting region LA3 adjacent to each other in the first direction DR1.

Accordingly, as the first protruding portion BMP1-1, which has a relatively large area between two second light-emitting regions LA2 adjacent to each other in the first direction DR1 in which the deviation of the separation distances between the light-emitting regions LA1, LA2, and LA3 is large, does not overlap the light-emitting regions LA1, LA2, and LA3 in the third direction DR3, and the second protruding portion BMP2-1, which has a relatively small area compared to the first protruding portion BMP1-1 between the first light-emitting region LA1 and the third light-emitting region LA3 adjacent to each other in the first direction DR1, does not overlap the light-emitting regions LA1, LA2, and LA3 in the third direction DR3, it is possible to exhibit excellent display quality by adjusting light extraction characteristics depending on a viewing angle while preventing the blocking of emitted light. In an embodiment of the inventive concept, each of the first protruding portion BMP1-1 and the second protruding portion BMP2-1 may be positioned in a portion in which the first mesh line ML1-1 and the second mesh line ML2-1 cross each other. One embodiment may further include a cut portion CTP defined in the mesh lines ML1-1 and ML2-1.

The protruding portions BMP1-1 and BMP2-1 may have a shape that protrudes inside the opening regions EOP1-1, EOP2-1, and EOP3-1 defined by the mesh lines ML1-1 and ML2-1. The size of the first protruding portion BMP1-1 in the first direction DR1 may be larger than the size of the second protruding portion BMP2-1 in the first direction DR1, and accordingly, the distance between the light-emitting region LA2 and the conductive layer 240 (see FIG. 5) may be reduced due to the first protruding portion BMP1-1 when compared to the distance before the first protruding portion BMP1-1 is introduced. In an embodiment of the inventive concept, as the difference between the separation distance between the first protruding portion BMP1-1 and the second light-emitting region LA2 and the separation distance between the second protruding portion BMP2-1 and the first or third light-emitting region LA1 or LA3 is reduced, light blocking characteristics occurring by the conductive layer 240 (see FIG. 5) may appear at a similar level throughout the light-emitting regions. For example, the display device, according to an embodiment of the inventive concept, may include an input sensor in which protruding portions having different sizes are disposed according to the difference in separation distance between the light-emitting regions of the display panel. In an embodiment of the inventive concept, as the protruding portion having a relatively large size is disposed between the light-emitting regions having a relatively large separation distance therebetween, it is possible to adjust the difference in separation distance in one direction between the conductive layer and the light-emitting regions to a similar level throughout the light-emitting regions, thereby reducing the deviation of a color difference depending on a viewing angle and exhibiting excellent display quality.

FIGS. 8A and 10 respectively illustrate embodiments of the display device having the configurations of the display regions of FIGS. 4A and 4B, and the arrangement form of the protruding portions described with reference to FIGS. 8A to 10 and the like is not necessarily limited to what is illustrated and may vary depending on the arrangement form of the light-emitting regions.

Each of FIGS. 11A to 11E and FIG. 12 is a plan view illustrating a portion of the display device according to an embodiment of the inventive concept. Each of FIGS. 11A to 11E and FIG. 12 exemplarily illustrates a region corresponding to region AA of FIG. 7. In addition, the contents of the configuration of the display device described with reference to FIGS. 8A and 8B excluding the contents of the shapes of the protruding portions may be equally applied to the display device according to an embodiment of the inventive concept illustrated in FIGS. 11A to 11E and FIG. 12.

In an embodiment of the inventive concept illustrated in FIGS. 11A to 11E and FIG. 12, the shape of the first protruding portion is different from the shape of the first protruding portion BMP1 illustrated in FIG. 8A. One embodiment illustrated in FIGS. 11A to 11E and FIG. 12 may include mesh lines ML and protruding portions. In an embodiment of the inventive concept, each of the first protruding portion and the second protruding portion may have a shape that protrudes from the second mesh line ML2 toward the light-emitting regions LA1, LA2, and LA3. In addition, a cut portion CTP may be defined in the third mesh line ML3. The cut portion CTP may be additionally defined in the first mesh line ML1 or the second mesh line ML2.

FIGS. 11A to 11E and FIG. 12 illustrate that the second protruding portion BMP2 has a circular shape in a plan view, but the second protruding portion BMP2 may have the same shape as the first protruding portion in each embodiment. In addition, the embodiment of the inventive concept is not necessarily limited thereto, and the second protruding portion BMP2 may have a shape different from that of the first protruding portion independently of the first protruding portion. Even in this case, however, in each embodiment, the area of the second protruding portion BMP2 may be smaller than the area of the first protruding portion, and the size of the second protruding portion BMP2 in the first direction DR1 may be smaller than the size of the first protruding portion in the first direction DR1.

Figure 11A:
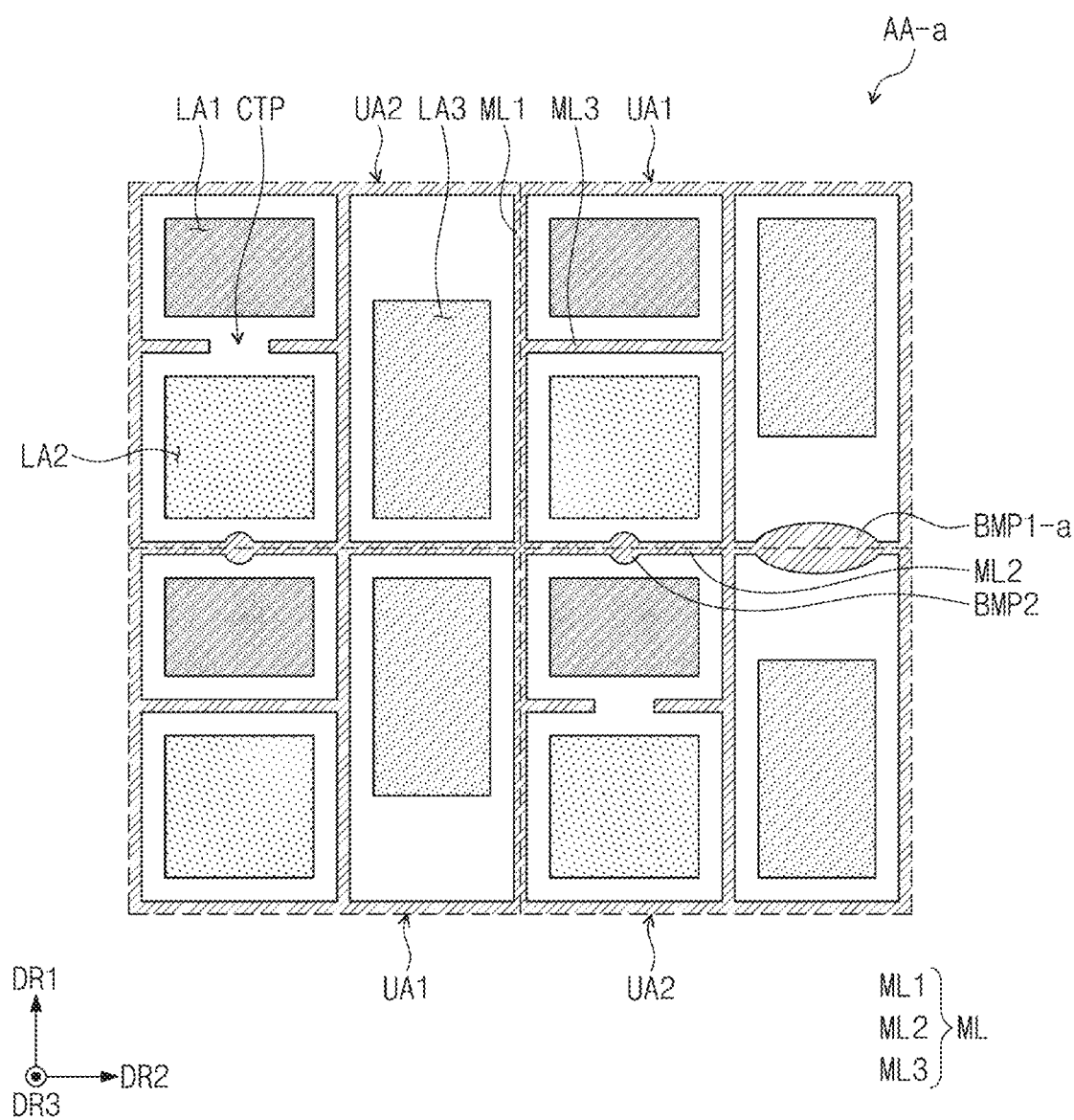
FIGS. 11A to 11E and FIG. 12 are enlarged plan views of a portion of the display device according to an embodiment of the inventive concept.
Figure 11B:
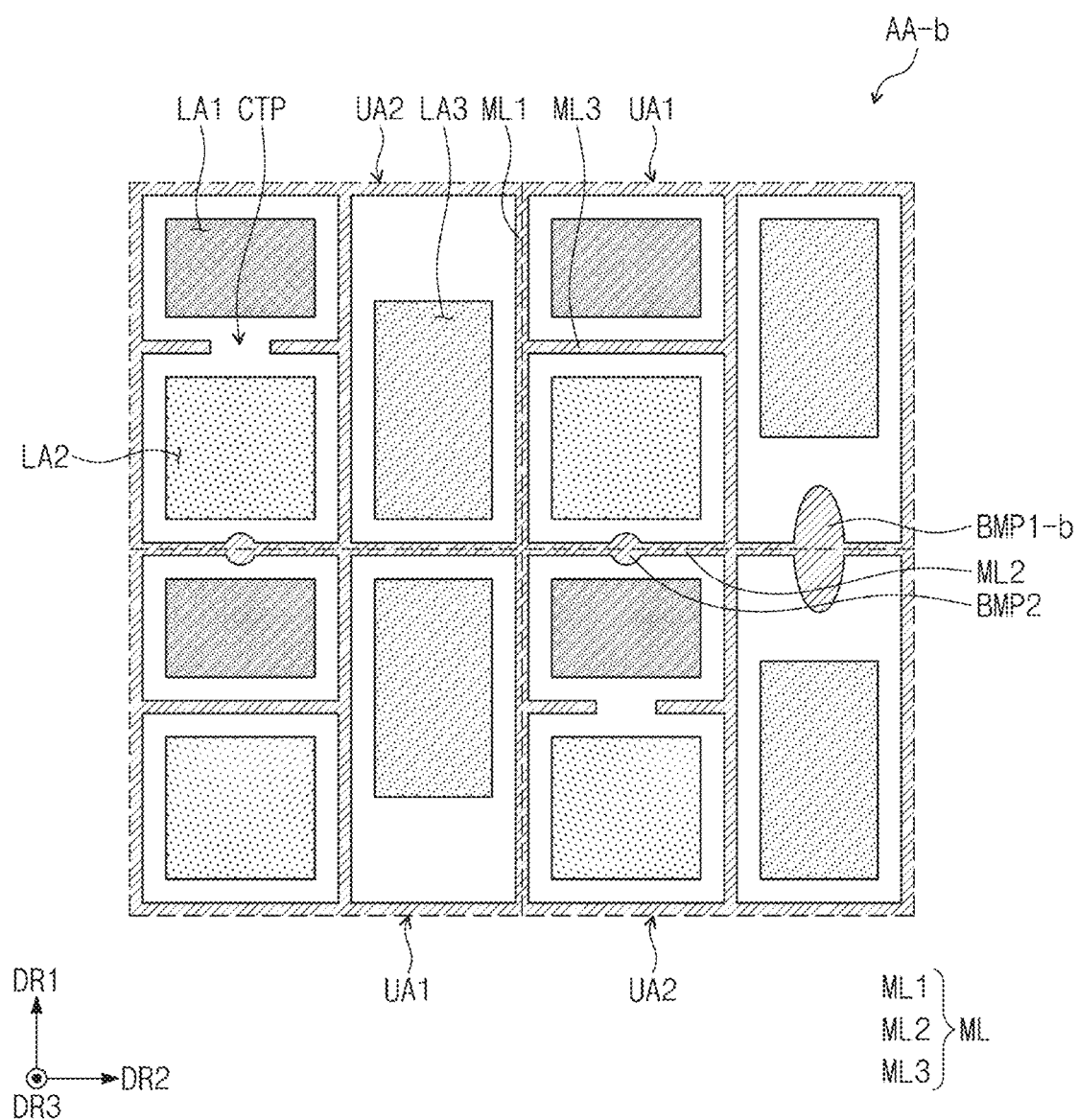

In a portion AA-a illustrated in FIG. 11A and a portion AA-b illustrated in FIG. 11B, the first protruding portions BMP1-*a* and BMP1-*b* are illustrated to have an oval shape in a plan view. The first protruding portion BMP1-*a* in the portion AA-a illustrated in FIG. 11A may have an oval shape that is larger in the second direction DR2 than in the first direction DR1. When compared to this, the first protruding portion BMP1-*b* in the portion AA-b illustrated in FIG. 11B may have an oval shape that is larger in the first direction DR1 than in the second direction DR2.

In FIGS. 11A and 11B, the planar areas of the first protruding portions BMP1-*a* and BMP1-*b* may be larger than the planar area of the second protruding portion BMP2. The sizes of the first protruding portions BMP1-*a* and BMP1-*b* in the first direction DR1 may be larger than the size of the second protruding portion BMP2 in the first direction DR1.

In an embodiment of the inventive concept illustrated in FIG. 11B, in the case of the first protruding portion BMP1-*b*, the size of the first protruding portion BMP1-*b* is larger in the first direction DR1 than in the second direction DR2, and when the first protruding portion BMP1-*b* is disposed between the light-emitting regions LA3 having a relatively large separation distance therebetween in the first direction DR1, the effect of reducing a color difference depending on a viewing angle in the display device may be furthered.

Figure 11C:
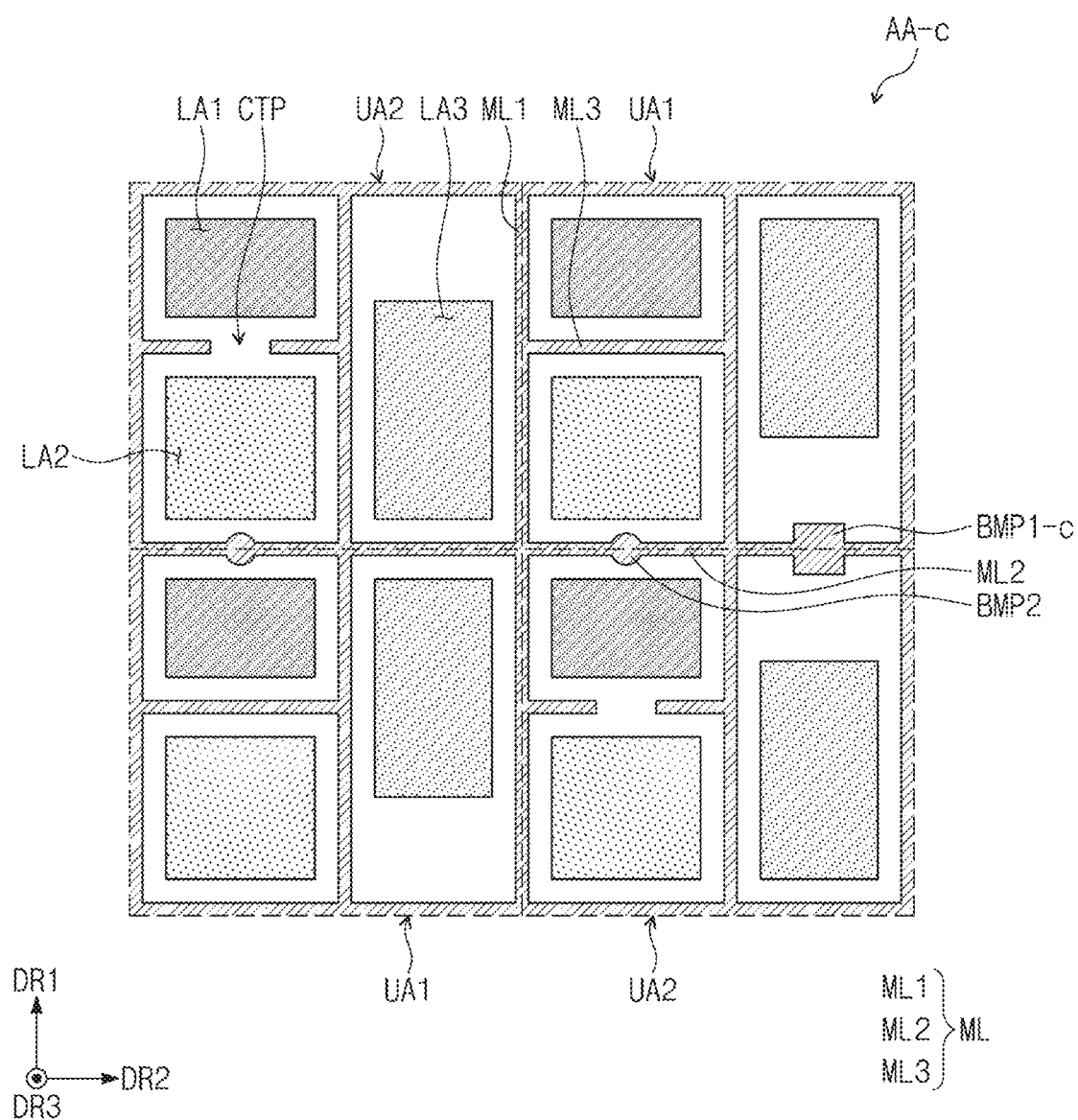
Figure 11D:
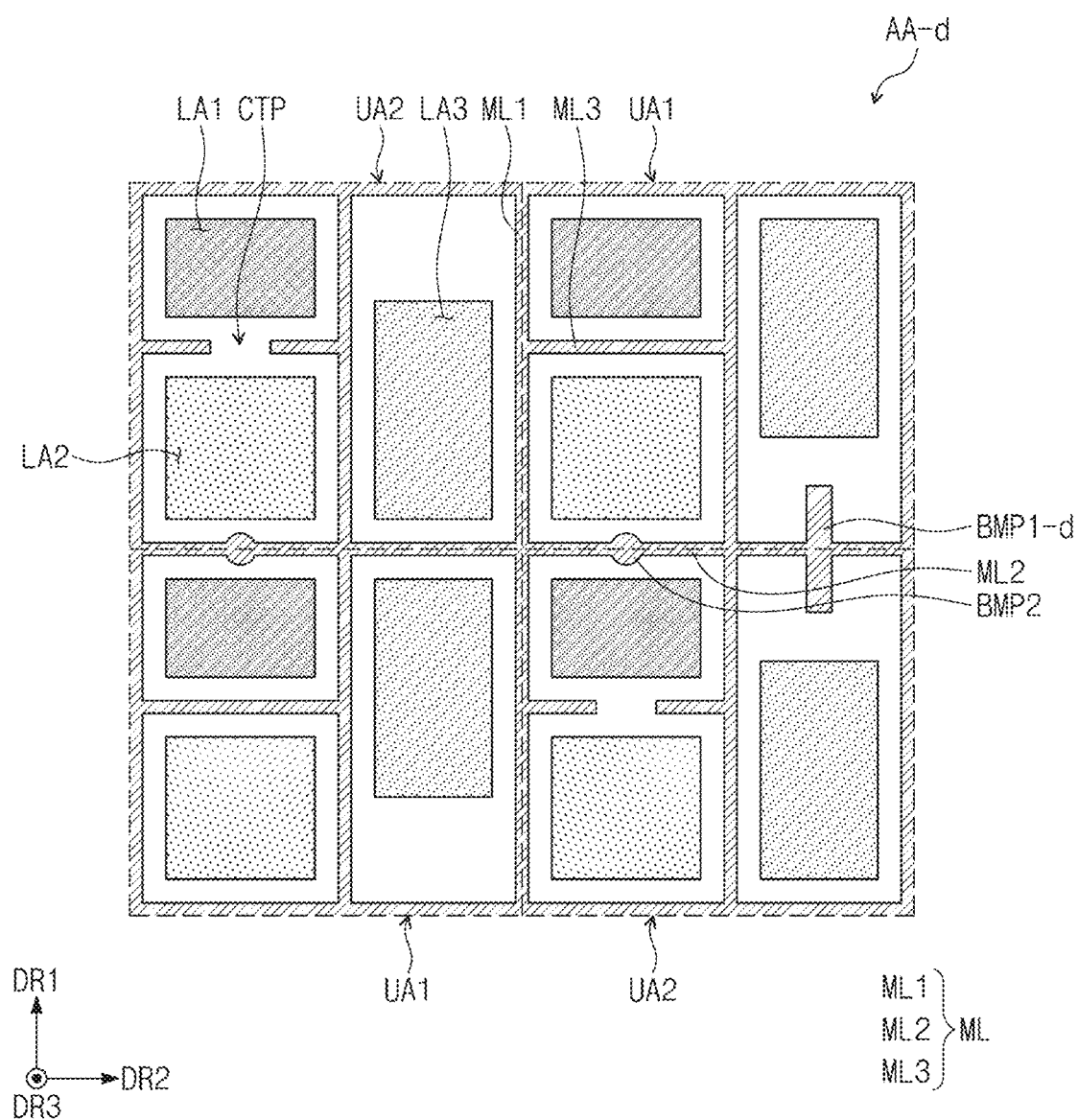

In a portion AA-c illustrated in FIG. 11C and a portion AA-d illustrated in FIG. 11D, first protruding portions BMP1-*c* and BMP1-*d* are illustrated to have a tetragonal shape in a plan view. The first protruding portion BMP1-*c* in the portion AA-c illustrated in FIG. 11C may have a square shape having substantially the same size both in the first direction DR1 and in the second direction DR2. When compared to this, the first protruding portion BMP1-*d* in the portion AA-d illustrated in FIG. 11D may have a rectangular shape having a size larger in the first direction DR1 than in the second direction DR2.

In FIGS. 11C and 11D, the planar areas of the first protruding portion BMP1-*c* and BMP1-*d* may be larger than the planar area of the second protruding portion BMP2. The sizes of the first protruding portions BMP1-*c* and BMP1-*d* in the first direction DR1 may be larger than the size of the second protruding portion BMP2 in the first direction DR1.

In an embodiment of the inventive concept illustrated in FIG. 11D, in the case of the first protruding portion BMP1-*d*, the size of the first protruding portion BMP1-*d* is larger in the first direction DR1 than in the second direction DR2, and when the first protruding portion BMP1-*d* is disposed between the light-emitting regions LA3 having a relatively large separation distance therebetween in the first direction DR1, the effect of reducing a color difference depending on a viewing angle in the display device may be furthered.

Figure 11E:
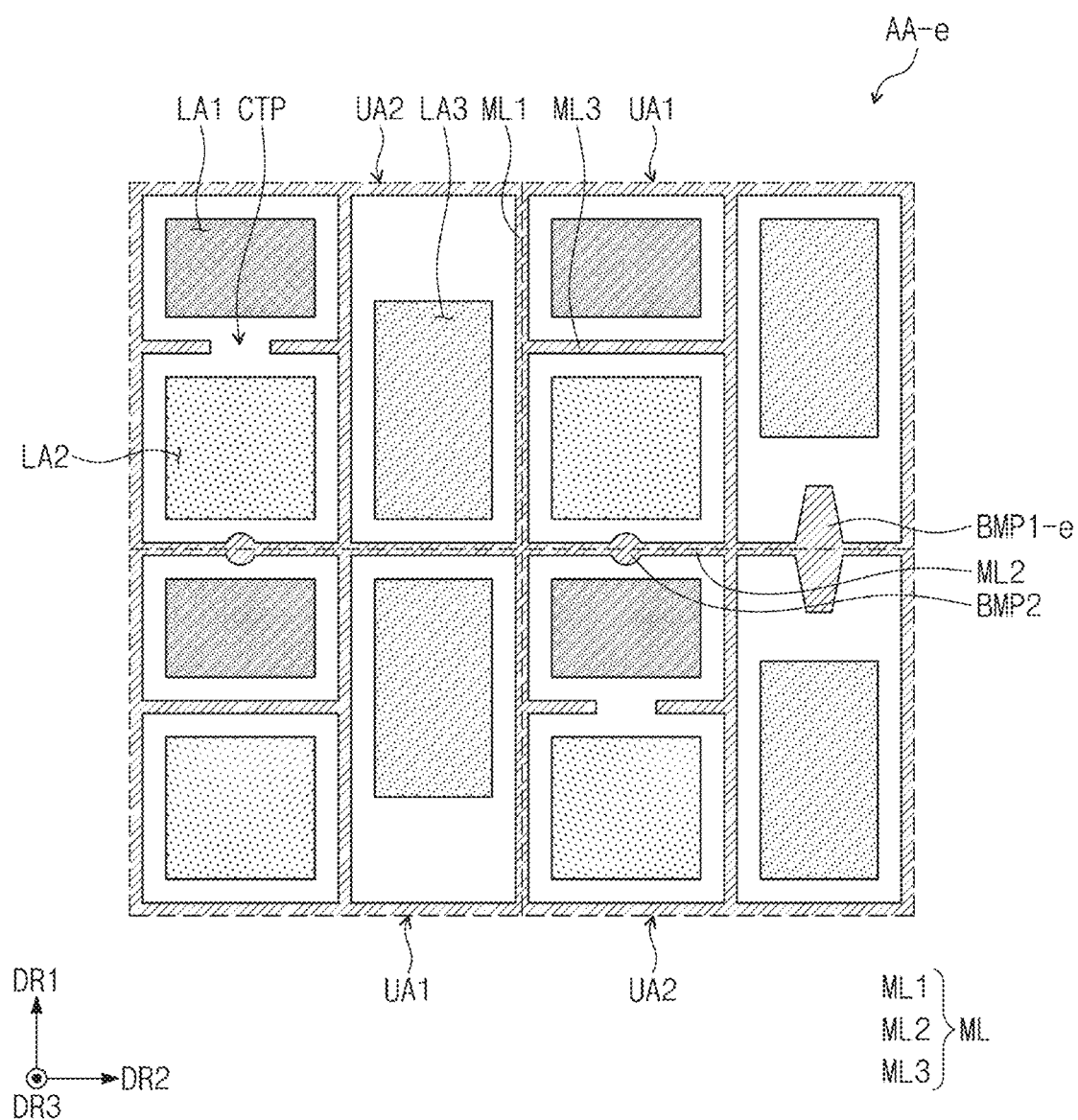

In a portion AA-e illustrated in FIG. 11E, a first protruding portion BMP1-*e* is illustrated to have a polygonal shape in a plan view. FIG. 11E illustrates an embodiment in which the first protruding portion BMP1-*e* has a hexagonal shape in a plan view. In FIG. 11E, the planar area of the first protruding portion BMP1-*e* may be larger than the planar area of the second protruding portion BMP2. The size of the first protruding portion BMP1-*e* in the first direction DR1 may be larger than the size of the second protruding portion BMP2 in the first direction DR1.

In an embodiment of the inventive concept illustrated in FIG. 11E, in the case of the first protruding portion BMP1-*e*, the size of the first protruding portion BMP1-*e* is larger in the first direction DR1 than in the second direction DR2, and when the first protruding portion BMP1-*e* is disposed between the light-emitting regions LA3 having a relatively large separation distance therebetween, the effect of reducing a color difference depending on a viewing angle in the display device may be furthered.

Figure 12:
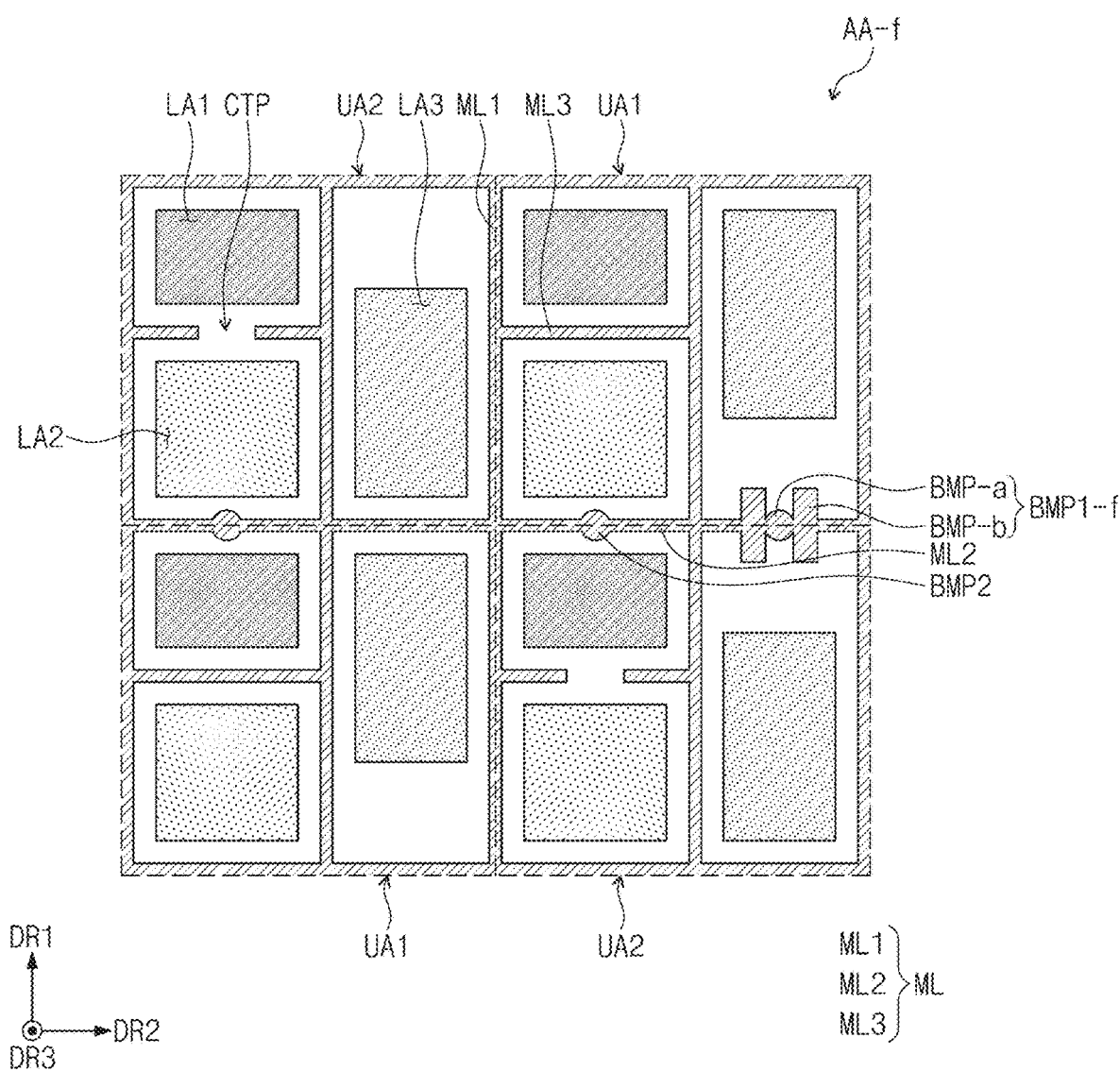

In a portion AA-f illustrated in FIG. 12, a first protruding portion BMP1-*f* is illustrated to have a shape formed by a combination of two shapes in a plan view. In an embodiment of the inventive concept illustrated in FIG. 12, the first protruding portion BMP1-*f* may include a first sub-protruding portion BMP-a that is circular in a plan view and a second sub-protruding portion BMP-b that is tetragonal in a plan view.

In an embodiment of the inventive concept illustrated in FIG. 12, the planar area of the first protruding portion BMP1-*f*, which has a shape formed by a combination of the first sub-protruding portion BMP-a and the second sub-protruding portion BMP-b, may be greater than the planar area of the second protruding portion BMP2. The first protruding portion BMP1-*f* may include a second sub-protruding portion BMP-b having a size in the first direction DR1, which is larger than the size of the second protruding portion BMP2 in the first direction DR1.

In an embodiment of the inventive concept illustrated in FIG. 12, as the first protruding portion BMP1-*f* includes a portion having a size which is larger in the first direction DR1 than in the second direction DR2, the effect of reducing a color difference depending on a viewing angle in the display device may be furthered when the first protruding portion BMP1-*f* is disposed between the light-emitting regions LA3 having a relatively large separation distance therebetween.

Figure 13A:
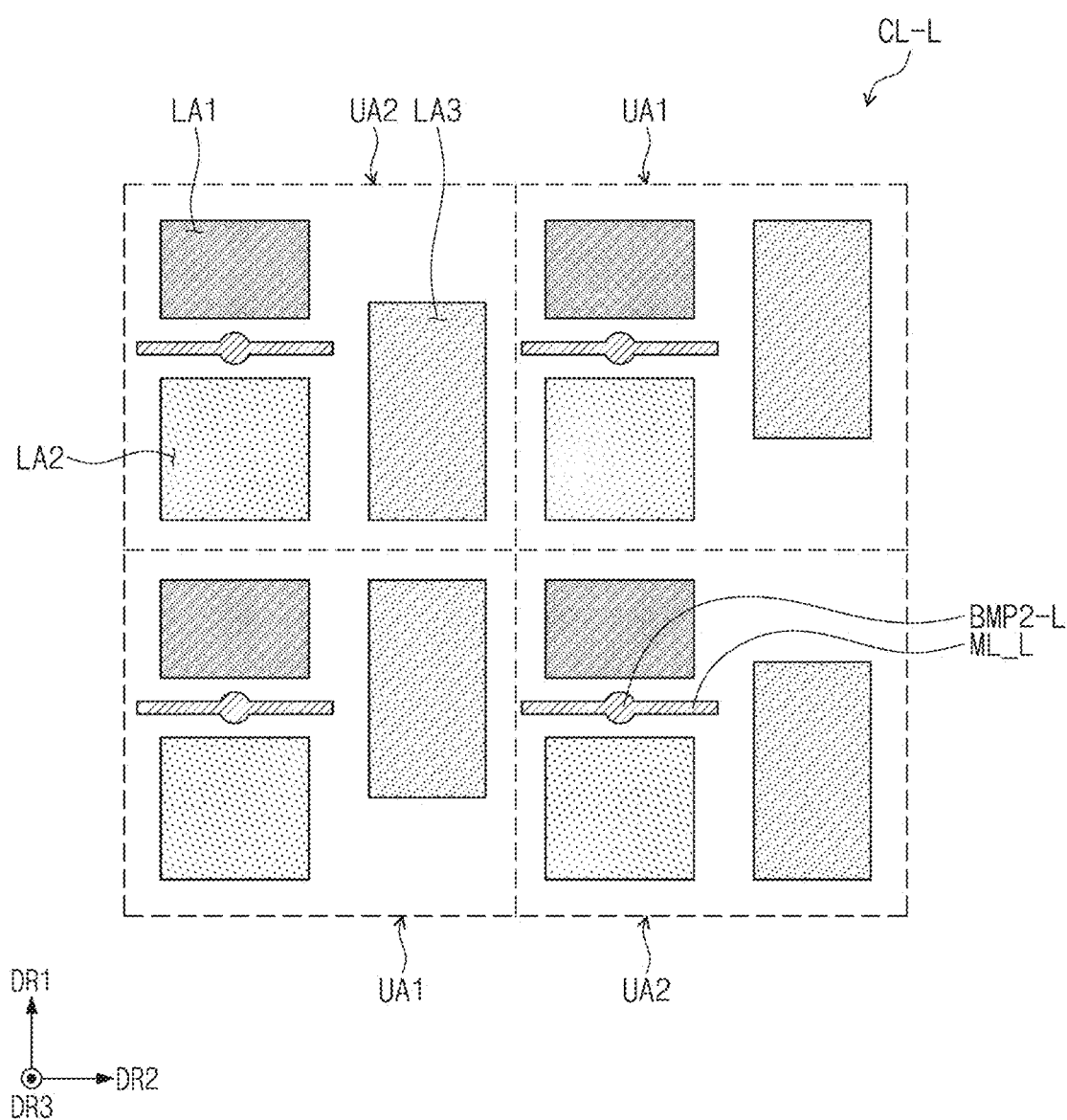
FIGS. 13A to 13C are enlarged plan views of a portion of the display device according to an embodiment of the inventive concept.
Figure 13B:
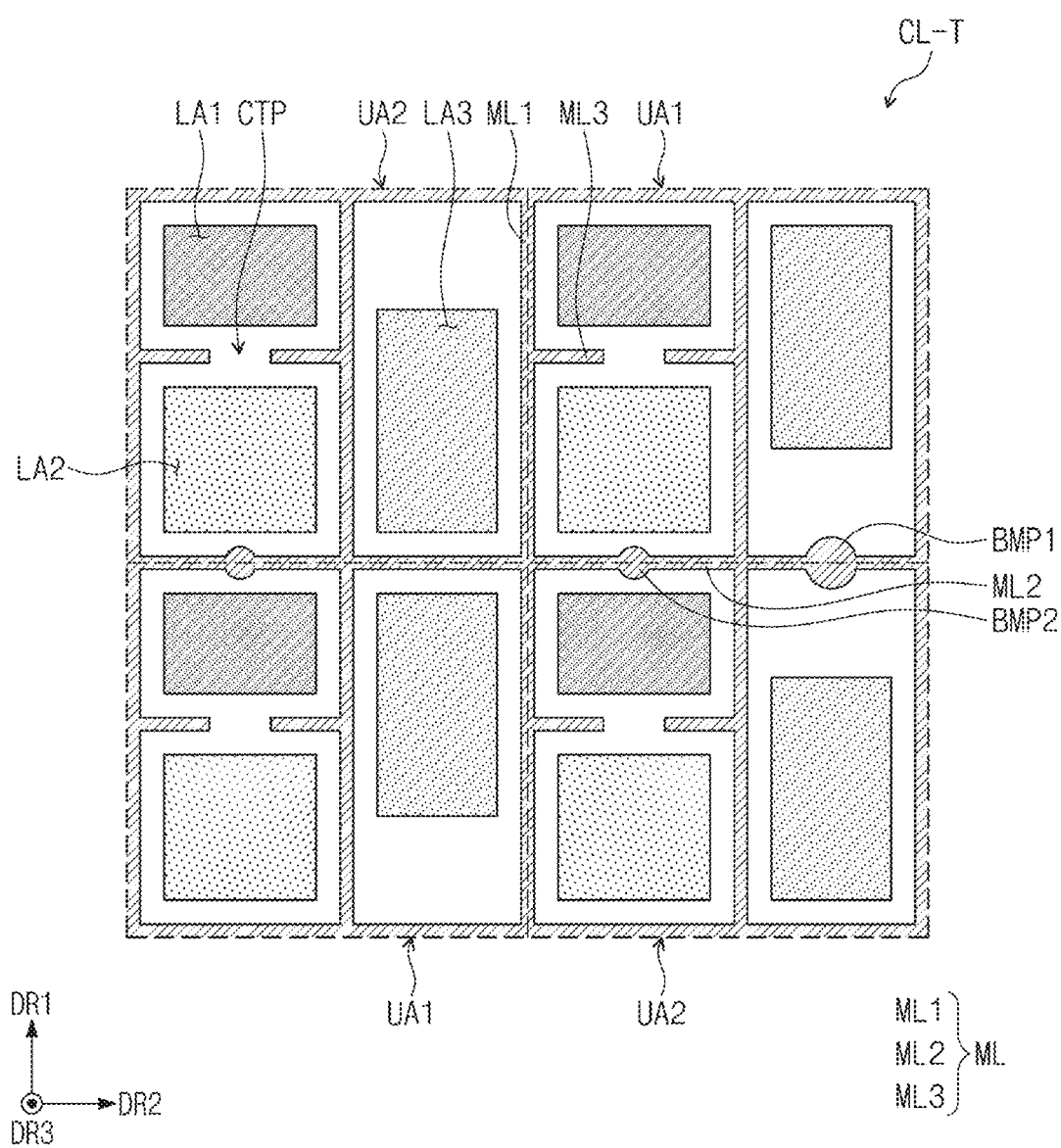
Figure 13C:
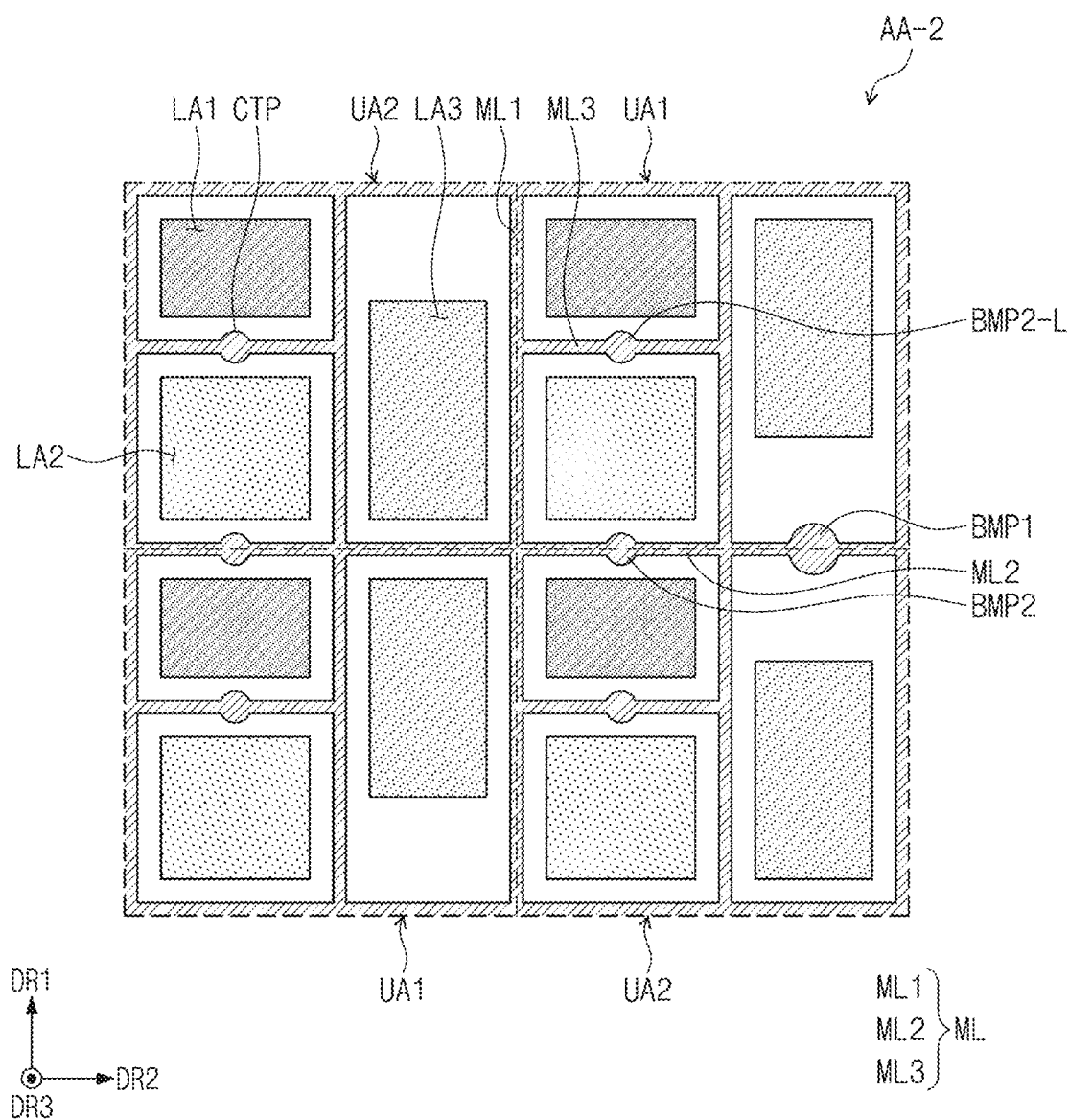

FIGS. 13A to 13C are plan views illustrating a portion of the display device according to an embodiment of the inventive concept. FIG. 13C is exemplarily illustrated as a region corresponding to region AA of FIG. 7. Each of FIG. 13A and FIG. 13B illustrates a shape of some layers of the display device according to an embodiment of the inventive concept, which has the structure of FIG. 13C. The contents of the configuration of the display device described with reference to FIGS. 8A and 8B excluding the contents of the shapes of the protruding portions may be equally applied to the descriptions of FIGS. 13A to 13C.

FIG. 13A exemplarily illustrates a portion of the same layer as a layer in which the first conductive layer 220 (see FIG. 5) is disposed in the input sensor 200 (see FIG. 5) illustrated in FIG. 5. For example, FIG. 13A may be a portion corresponding to the same layer as the first conductive layer 220 (see FIG. 5) as a lower conductive layer CL-L.

Referring to FIG. 13A, the mesh pattern MP (see FIG. 7) may further include a lower mesh line ML_L and a third protruding portion BMP2-L. The third protruding portion BMP2-L may have a shape that protrudes from the lower mesh line ML_L toward the light-emitting regions LA1, LA2, and LA3. The third protruding portion BMP2-L may be disposed between the first light-emitting region LA1 and the second light-emitting region LA2 in each of the first light-emitting unit UA1 and the second light-emitting unit UA2. In FIG. 13A, the third protruding portion BMP2-L is illustrated in each of the first light-emitting unit UA1 and the second light-emitting unit UA2, but the embodiment of the inventive concept is not necessarily limited thereto, and the third protruding portion BMP2-L may be disposed only in some of the plurality of first light-emitting units UA1 and the plurality of second light-emitting units UA2.

In FIG. 13A, the lower mesh line ML_L is illustrated to have a length in the second direction DR2, which entirely overlaps the first light-emitting region LA1 and the second light-emitting region LA2 in the first direction DR1. However, the embodiment of the inventive concept is not necessarily limited thereto, and the lower mesh line ML_L may overlap only a portion of the first light-emitting region LA1 and the second light-emitting region LA2 in the first direction DR1. In an embodiment of the inventive concept, the length of the lower mesh line ML_L in the second direction DR2 may be greater than or equal to the distance in the second direction DR2 of the cut portion CTP defined in an upper conductive layer CL-T, which will be described later.

FIG. 13B exemplarily illustrates a portion of the same layer as a layer in which the second conductive layer 240 (see FIG. 5) is disposed in the input sensor 200 (see FIG. 5) illustrated in FIG. 5. For example, FIG. 13B may be a portion corresponding to the same layer as the second conductive layer 240 (see FIG. 5) as an upper conductive layer CL-T. The upper conductive layer CL-T may have the same configuration as the mesh line ML, the first protruding portion BMP1, and the second protruding portion BMP2 of FIG. 8A described above. A plurality of cut portions CTP may be defined in the upper conductive layer CL-T illustrated in FIG. 13B. The upper conductive layer CL-T may be stacked on top of the lower conductive layer CL-L.

FIG. 13C is a plan view illustrating a partial region AA-2 of the display device according to an embodiment of the inventive concept, which includes a lower conductive layer CL-L and an upper conductive layer CL-T disposed on the lower conductive layer CL-L.

When the lower conductive layer CL-L and the upper conductive layer CL-T are stacked, the third protruding portion BMP2-L may overlap the cut portion CTP. In addition, the size of the third protruding portion BMP2-L in the first direction DR1 may be smaller than the size of the first protruding portion BMP1 in the first direction DR1.

The display device, according to an embodiment of the inventive concept, may include a first protruding portion BMP1 disposed in a portion in which a separation distance between the light-emitting regions is relatively large, a second protruding portion BMP2 disposed on the same layer as the first protruding portion BMP1 and having a smaller area than the first protruding portion BMP1, a cut portion CTP defined in the mesh line ML on the same layer as the first and second protruding portions BMP1 and BMP2, and a third protruding portion BMP2-L overlapping the cut portion CTP in the third direction DR3, which is the thickness direction, and disposed on a layer different from that of the cut portion CTP. Accordingly, the display device, according to an embodiment of the inventive concept, may reduce a visibility issue in which the boundary cut portions formed at specific positions in the sensing patterns of the input sensor or the specific shapes of mesh lines are visible, and by disposing the first protruding portion having a relatively large size in a portion in which a separation distance between the light-emitting regions is large, it is possible to reduce the deviation of color differences for each viewing angle depending on the difference in separation distance between the light-emitting regions. Accordingly, the display device, according to an embodiment of the inventive concept, may have better visibility and exhibit excellent viewing angle characteristics with a reduced deviation of color differences across the entire display region.

Figure 14A:
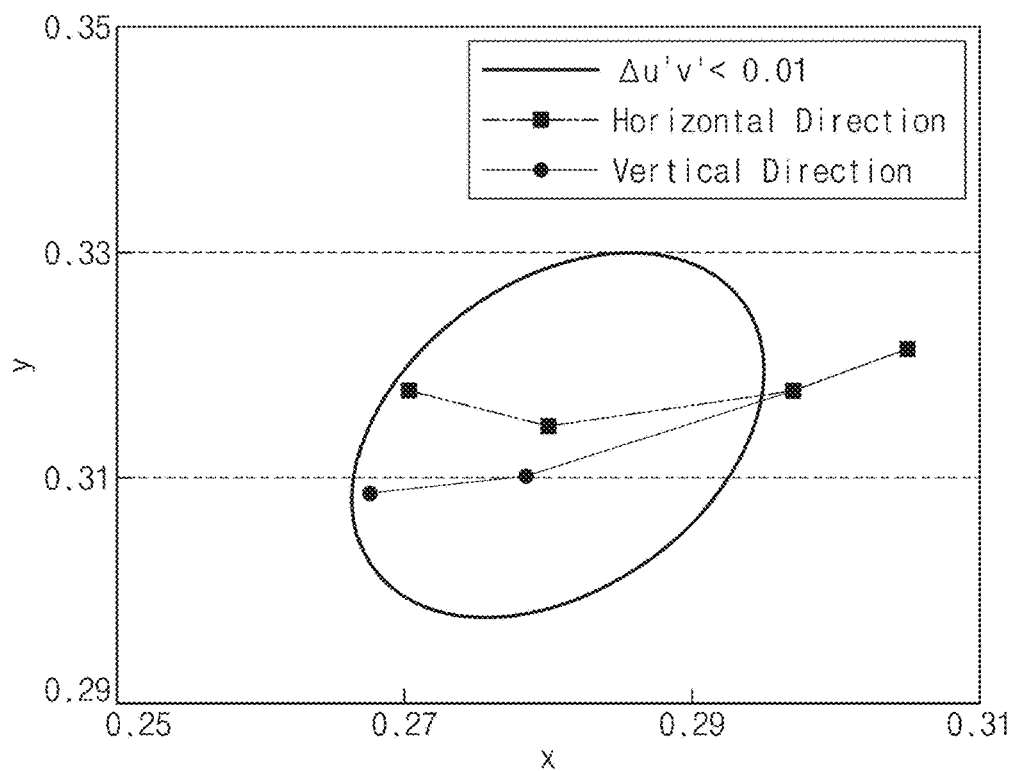
FIGS. 14A to 14C are graphs showing color differences depending on viewing angles.
Figure 14B:
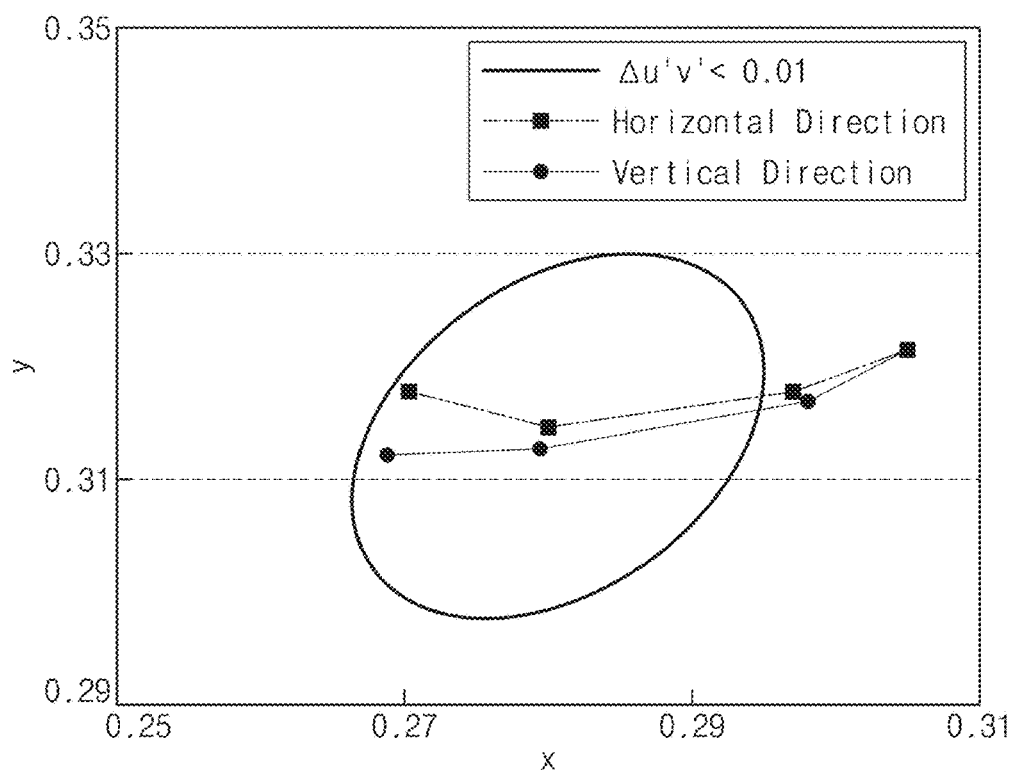
Figure 14C:
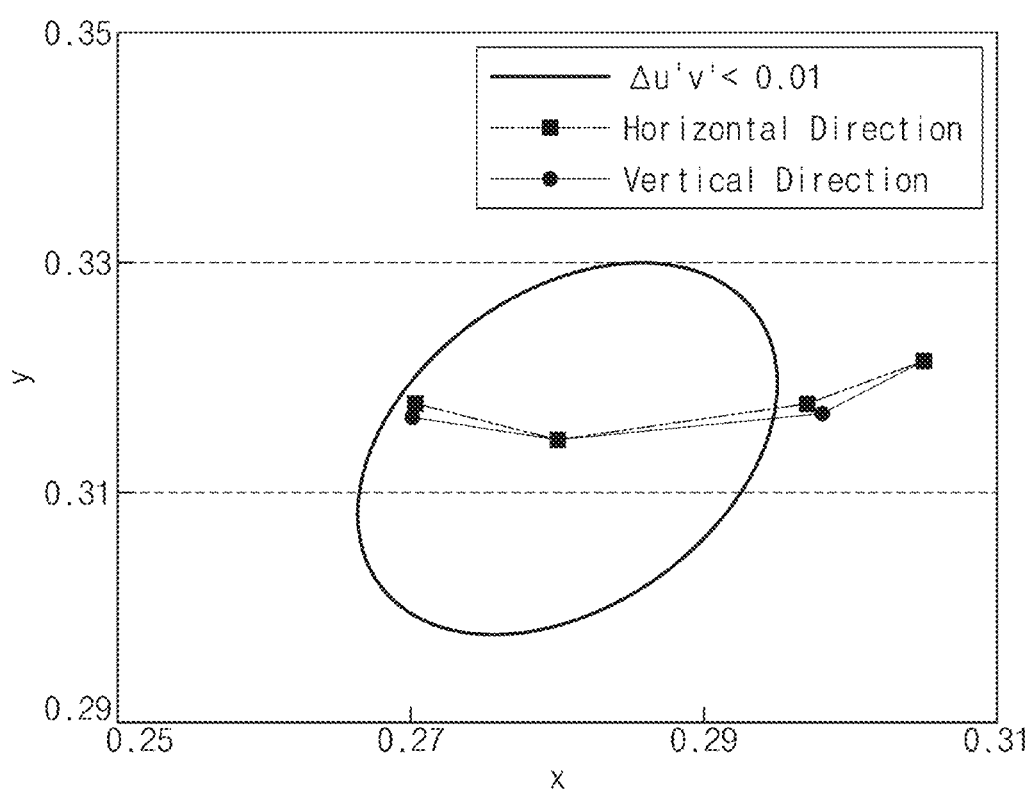

Table 1 below and FIGS. 14A to 14C show the results of comparing and evaluating color differences for each viewing angle according to a comparative embodiment and embodiments. FIG. 14A corresponds to the results of Comparative Embodiment in Table 1, and FIGS. 14B and 14C respectively correspond to the results of Embodiment 1 and Embodiment 2 in Table 1.

The protruding portion used in the evaluation of Table 1 and FIGS. 14A to 14C has a square shape in a plan view. Comparative Embodiment corresponds to a case in which both the first protruding portion and the second protruding portion have the same size of 1 μm×1 μm. Embodiment 1, unlike Comparative Embodiment, corresponds to a case in which the size of the first protruding portion is 2 μm×2 μm. Embodiment 2, unlike Comparative Embodiment, corresponds to a case in which the size of the first protruding portion is 4 μm×4 μm. For example, compared to Comparative Embodiment, each of Embodiment 1 and Embodiment 2 differs in that the size of the first protruding portion becomes larger.

In the evaluation results in Table 1 and FIGS. 14A to 14C, horizontal viewing angles correspond to viewing angles in a direction parallel to the second direction DR2 illustrated in FIG. 8A and the like, and vertical viewing angles correspond to viewing angles in a direction parallel to the first direction DR1 illustrated in FIG. 8A and the like.

FIGS. 14A to 14C illustrate the color coordinates of white light of Comparative Embodiment, Embodiment 1, and Embodiment 2 according to horizontal and vertical viewing angles. The portions marked with a solid line in FIGS. 14A to 14C correspond to portions in which a color difference (Δu'v') is less than 0.01.

TABLE 1

| | | Division | | | | | |
|---|---|---|---|---|---|---|---|
| | | Comparative Embodiment | Embodiment 1 | | Embodiment 2 | | |
| | | | Size of first protruding portion | | | | |
| | | 1 μm × 1 μm | 2 μm × 2 μm | | 4 μm × 4 μm | | |
| | | | Size of second protruding portion | | | | |
| | | 1 μm × 1 μm | 1 μm × 1 μm | | 1 μm × 1 μm | | |
| | | | Color coordinate | | | | |
| | | x | y | x | y | x | y |
| horizontal viewing angle | 0° | 0.3054 | 0.3213 | 0.3054 | 0.3213 | 0.3054 | 0.3213 |
| | 30° | 0.2975 | 0.3177 | 0.2975 | 0.3177 | 0.2975 | 0.3177 |
| | 45° | 0.2803 | 0.3144 | 0.2803 | 0.3144 | 0.2803 | 0.3144 |
| | 60° | 0.2708 | 0.3174 | 0.2708 | 0.3174 | 0.2708 | 0.3174 |
| Vertical viewing angle | 0° | 0.3054 | 0.3213 | 0.3054 | 0.3213 | 0.3054 | 0.3213 |
| | 30° | 0.2975 | 0.3177 | 0.2981 | 0.3168 | 0.2981 | 0.3168 |
| | 45° | 0.2788 | 0.3100 | 0.2796 | 0.3126 | 0.2803 | 0.3144 |
| | 60° | 0.2678 | 0.3085 | 0.2689 | 0.3119 | 0.2703 | 0.3161 |

Referring to the evaluation results of color differences depending on the viewing angles shown in Table 1 and FIGS. 14A to 14C, it can be seen that as the size of the first protruding portion increases, the difference in y color coordinates according to viewing angles in the vertical direction decreases. In addition, it can be seen that although viewing angles vary as the size of the first protruding portion increases, y color coordinates show a similar value to the y color coordinates in the 0° direction (i.e., the front direction).

In addition, the horizontal color coordinates appeared similar regardless of the size of the first protruding portion. This is thought to be because, when the light-emitting regions are arranged as illustrated in FIG. 8A and the like, the difference in separation distance between the light-emitting regions in the second direction DR2 is not large. For example, it can be seen that the arrangement of the protruding portion has a greater influence on viewing angle characteristics in a direction in which the difference in separation distance between the light-emitting regions is large.

In addition, from the results of Table 1 and FIGS. 14A to 14C, it can be seen that a color difference decreases in the front direction and in a direction in which a viewing angle is increased as the size of the first protruding portion disposed in a portion, in which a separation distance between the light-emitting regions is relatively large, increases.

As the display device, according to an embodiment of the inventive concept, includes a protruding portion having a different size depending on a separation distance between the light-emitting regions on the conductive layer of the input sensor, it is possible to reduce the difference in viewing angle characteristics depending on the difference in separation distance between the light-emitting regions. In addition, in the display device, according to an embodiment of the inventive concept, as the light-emitting region and the protruding portion overlap each other in one direction in which the difference in separation distance between the light-emitting regions is large, it is possible to reduce a color difference due to a separation distance between the light-emitting regions, thereby exhibiting excellent color characteristics and display quality.

The display device, according to an embodiment of the inventive concept, may exhibit excellent display quality by varying the size of the protruding portion included in the sensing pattern of the input sensor according to a separation distance between the light-emitting regions.

In addition, the display device, according to an embodiment of the inventive concept, may reduce a color difference depending on a viewing angle according to the arrangement of the light-emitting regions by differentially applying protruding portions of different sizes depending on a separation distance between the light-emitting regions.

Although the above has been described with reference to embodiments of the inventive concept, those skilled in the art or those of ordinary skill in the art will understand that various modifications and changes can be made to the inventive concept within the scope that does not depart from the spirit and technical field of the inventive concept.

Accordingly, the technical scope of the inventive concept should not necessarily be limited to the content described in the detailed description of the specification.

What is claimed is:

1. A display device, comprising:
   a display panel comprising a plurality of light-emitting regions; and
   an input sensor disposed on the display panel and comprising a plurality of sensing patterns,
   wherein the plurality of sensing patterns comprise:
      a plurality of mesh lines defining a plurality of opening regions respectively overlapping the plurality of light-emitting regions; and
      a plurality of protruding portions having a shape protruding from at least one of the mesh lines into the opening regions,
   wherein the plurality of protruding portions comprise:
      a first protruding portion disposed between light-emitting regions spaced apart from each other by a first distance in a first direction among the light-emitting regions; and
      a second protruding portion disposed between light-emitting regions spaced apart from each other by a second distance that is smaller than the first distance in the first direction among the light-emitting regions and has a smaller area than that the first protruding portion in a plan view.

2. The display device of claim 1, wherein the protruding portions are formed integrally with the mesh lines.

3. The display device of claim 1, wherein, in the plan view, each of the protruding portions has a circular, oval, tetragonal, or polygonal shape, or a combination of the above shapes.

4. The display device of claim 1, wherein, as the first distance increases, the area of the first protruding portion, in the plan view, increases.

5. The display device of claim 1, wherein, as the first distance increases, the size of the first protruding portion in the first direction increases.

6. The display device of claim 1, wherein:
   the size of the first protruding portion in the first direction is smaller than the first distance; and
   the size of the first protruding portion in a second direction crossing the first direction is smaller than the width of each of the light-emitting regions in the second direction.

7. The display device of claim 1, wherein the sensing patterns further comprise cut portions defined in some of the mesh lines.

8. The display device of claim 1, wherein:
   the light-emitting regions are spaced apart from each other in the plan view;
   a separation distance between the light-emitting regions neighboring each other in the first direction is greater than a separation distance therebetween in a second direction that is different from the first direction; and
   the protruding portions are not disposed between the light-emitting regions spaced apart from each other in the second direction.

9. The display device of claim 1, wherein the input sensor is disposed directly on the display panel, and
   wherein the input sensor comprises:
      a plurality of insulating layers comprising a first sensor insulating layer, a second sensor insulating layer disposed on the first sensor insulating layer, and a third sensor insulating layer disposed on the second sensor insulating layer;
      a first sensor conductive layer disposed between the first sensor insulating layer and the second sensor insulating layer; and
      a second sensor conductive layer disposed between the second sensor insulating layer and the third sensor insulating layer,
   wherein the protruding portions are disposed on a same layer as the second sensor conductive layer.

10. The display device of claim 9, wherein the sensing patterns further comprise cut portions defined in some of the mesh lines on the same layer as the second sensor conductive layer.

11. The display device of claim 10, wherein the sensing patterns are disposed on a same layer as the first sensor conductive layer, and the sensing patterns further comprise a third protruding portion overlapping the cut portion.

12. A display device, comprising:
a display panel comprising a plurality of light-emitting units each comprising a first color light-emitting region, a second color light-emitting region spaced apart from the first color light-emitting region in a first direction, and a third color light-emitting region spaced apart from each of the first color light-emitting region and the second color light-emitting region in a second direction crossing the first direction; and
an input sensor disposed on the display panel, the input sensor comprising a plurality of mesh lines that do not overlap the first color light-emitting region, the second color light-emitting region, and the third color light-emitting region, and a plurality of protruding portions protruding from the mesh lines toward the color light-emitting regions,
wherein the plurality of light-emitting units comprise:
a first light-emitting unit with its third color light-emitting region overlapping an entirety of the first color light-emitting region and only a portion of the second color light-emitting region, in the second direction; and
a second light-emitting unit with its third color light-emitting region overlapping an entirety of the second color light-emitting region and only a portion of the first color light-emitting region, in the second direction,
wherein the plurality of protruding portions comprise:
a first protruding portion disposed between the third color light-emitting region of the first light-emitting unit and the third color light-emitting region of the second light-emitting unit; and
a second protruding portion disposed between the second color light-emitting region of the first light-emitting unit and the first light-emitting region of the second light-emitting unit,
wherein an area of the first protruding portion is larger than an area of the second protruding portion.

13. The display device of claim 12, wherein the first light-emitting unit and the second light-emitting unit are alternately arranged in each of the first direction and the second direction.

14. The display device of claim 13, wherein:
the third color light-emitting region of the first light-emitting unit and the third color light-emitting region of the second light-emitting unit, which are disposed with the first protruding portion interposed therebetween, are spaced apart from each other by a first distance; and
the second color light-emitting region of the first light-emitting unit and the first color light-emitting region of the second light-emitting unit, which are disposed with the second protruding portion interposed therebetween, are spaced apart from each other by a second distance that is smaller than the first distance.

15. The display device of claim 14, wherein, as the first separation distance increases, a size of the first protruding portion in the first direction increases.

16. The display device of claim 13, wherein a first portion, in which a separation distance between the third color light-emitting regions neighboring each other in the first direction is a first distance, and a second portion, in which a separation distance between the third color light-emitting regions is a third distance smaller than the first distance, are alternately disposed,
wherein the protruding portions are not disposed in the second portion.

17. The display device of claim 12, wherein:
a size of the first protruding portion in the first direction is less than or equal to a first distance between two third color light-emitting regions disposed with the first protruding portion interposed therebetween; and
a size of the first protruding portion in the second direction is less than or equal to the width of each of the third color light-emitting regions in the second direction.

18. The display device of claim 12, wherein the mesh lines define a plurality of opening regions respectively overlapping the first to third color light-emitting regions and comprise a first mesh line extending in the first direction and a second mesh line extending in the second direction.

19. The display device of claim 18, wherein the protruding portions are formed integrally with the second mesh line.

20. The display device of claim 18, wherein the mesh lines further comprise a third mesh line extending in the second direction and disposed between the first light-emitting region and the second light-emitting region.

21. The display device of claim 20, wherein the input sensor further comprises a cut portion defined in the third mesh line,
wherein the cut portion does not overlap the protruding portions in the second direction.

22. The display device of claim 12, wherein the first protruding portion and the second protruding portion overlap each other in the second direction.

23. The display device of claim 12, wherein:
the first color light-emitting region is a red light-emitting region;
the second color light-emitting region is a green light-emitting region; and
the third color light-emitting region is a blue light-emitting region.

24. A display device, comprising:
a display panel comprising a plurality of light-emitting regions; and
an input sensor disposed on the display panel and comprising a plurality of mesh lines defining a plurality of opening regions respectively overlapping the plurality of light-emitting regions and a plurality of protruding portions having a shape protruding from at least one of the mesh lines into the opening regions,
wherein the plurality of light-emitting regions comprise:
a first light-emitting region spaced apart from the mesh line in one direction by a first separation distance; and
a second light-emitting region spaced apart from the mesh line in the one direction by a second separation distance that is smaller than the first separation distance,
wherein the plurality of protruding portions comprise:
a first protruding portion protruding from the mesh line toward the first light-emitting region; and
a second protruding portion protruding from the mesh line toward the second light-emitting region and having a less size in the one direction than the first protruding portion.

25. The display device of claim 24, wherein the input sensor is disposed directly on the display panel and comprises:
- a plurality of insulating layers comprising a first sensor insulating layer, a second sensor insulating layer disposed on the first sensor insulating layer, and a third sensor insulating layer disposed on the second sensor insulating layer;
- a first sensor conductive layer disposed between the first sensor insulating layer and the second sensor insulating layer; and
- a second sensor conductive layer disposed between the second sensor insulating layer and the third sensor insulating layer,
- wherein the protruding portions are disposed on the same layer as the second sensor conductive layer.

26. An electronic device, comprising:
- a display panel comprising a plurality of light-emitting regions; and
- an input sensor disposed on the display panel and comprising a plurality of sensing patterns,
- wherein the plurality of sensing patterns comprise:
- a plurality of mesh lines defining a plurality of opening regions respectively overlapping the plurality of light-emitting regions; and
- a plurality of protruding portions having a shape protruding from at least one of the mesh lines into the opening regions,
- wherein the plurality of protruding portions comprise:
- a first protruding portion disposed between light-emitting regions spaced apart from each other by a first distance in a first direction among the light-emitting regions; and
- a second protruding portion disposed between light-emitting regions spaced apart from each other by a second distance that is smaller than the first distance in the first direction among the light-emitting regions and has a smaller area than that the first protruding portion in a plan view.

27. The electronic device of claim 26, wherein the electronic device is television, computer monitor, mobile phone, car navigation system, portable game console, or smart watch.

* * * * *